(12) United States Patent
Kobayashi

(10) Patent No.: US 11,838,674 B2
(45) Date of Patent: Dec. 5, 2023

(54) IMAGE PROCESSING SYSTEM, IMAGE PROCESSING METHOD AND STORAGE MEDIUM

(71) Applicant: CANON KABUSHIKI KAISHA, Tokyo (JP)

(72) Inventor: Kiwamu Kobayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 367 days.

(21) Appl. No.: 16/889,075

(22) Filed: Jun. 1, 2020

(65) Prior Publication Data
US 2020/0389573 A1  Dec. 10, 2020

(30) Foreign Application Priority Data
Jun. 4, 2019  (JP) ................................ 2019-104733

(51) Int. Cl.
*H04N 5/222* (2006.01)
*H04N 5/272* (2006.01)
*G06T 7/11* (2017.01)

(52) U.S. Cl.
CPC ............ *H04N 5/2226* (2013.01); *G06T 7/11* (2017.01); *H04N 5/272* (2013.01)

(58) Field of Classification Search
CPC .... H04N 5/2226; H04N 5/272; H04N 13/111; H04N 13/243; H04N 23/72; G06T 7/11; G06T 7/564; G06T 2207/30196; G06T 2207/30228
See application file for complete search history.

(56) References Cited

U.S. PATENT DOCUMENTS

| | | | |
|---|---|---|---|
| 8,811,811 B1 * | 8/2014 | Wetzel | G03B 37/04 396/322 |
| 9,445,081 B1 * | 9/2016 | Kouperman | G06T 7/38 |
| 2006/0028476 A1 * | 2/2006 | Sobel | G06T 13/00 345/474 |
| 2009/0022396 A1 * | 1/2009 | Watanabe | G06T 7/536 382/167 |
| 2009/0315978 A1 * | 12/2009 | Wurmlin | G06T 5/005 348/E13.001 |

(Continued)

FOREIGN PATENT DOCUMENTS

| | | |
|---|---|---|
| JP | 2001043458 A | 2/2001 |
| JP | 6403862 B1 | 10/2018 |

(Continued)

OTHER PUBLICATIONS

Laurentini, 1994. "The Visual Hull Concept for Silhouette-Based Image Understanding", IEEE Transactions on Pattern Analysis and Machine Intelligence. vol. 16, No. 2, pp. 150-162.

*Primary Examiner* — Katrina R Fujita
(74) *Attorney, Agent, or Firm* — ROSSI, KIMMS & McDOWELL LLP

(57) ABSTRACT

The image processing system acquires a foreground mask from a captured image acquired by capturing an object with an image capturing unit whose exposure value is set relatively higher or lower than that of another image capturing unit, acquires an inappropriate area mask by detecting an area whose exposure value is inappropriate in the captured image, and generates shape data representing a three-dimensional shape of the object based on the foreground mask and the inappropriate area mask.

16 Claims, 18 Drawing Sheets

(56) References Cited

U.S. PATENT DOCUMENTS

2013/0016097 A1\* 1/2013 Coene ................ G06T 15/205
  345/419
2019/0230334 A1\* 7/2019 Kano ..................... G06T 5/00
2021/0209783 A1\* 7/2021 Yamamoto ........... H04N 13/243

FOREIGN PATENT DOCUMENTS

| JP | 2019083402 A | 5/2019 |
| WO | 2017217241 A1 | 12/2017 |
| WO | 2018079260 A1 | 5/2018 |

\* cited by examiner

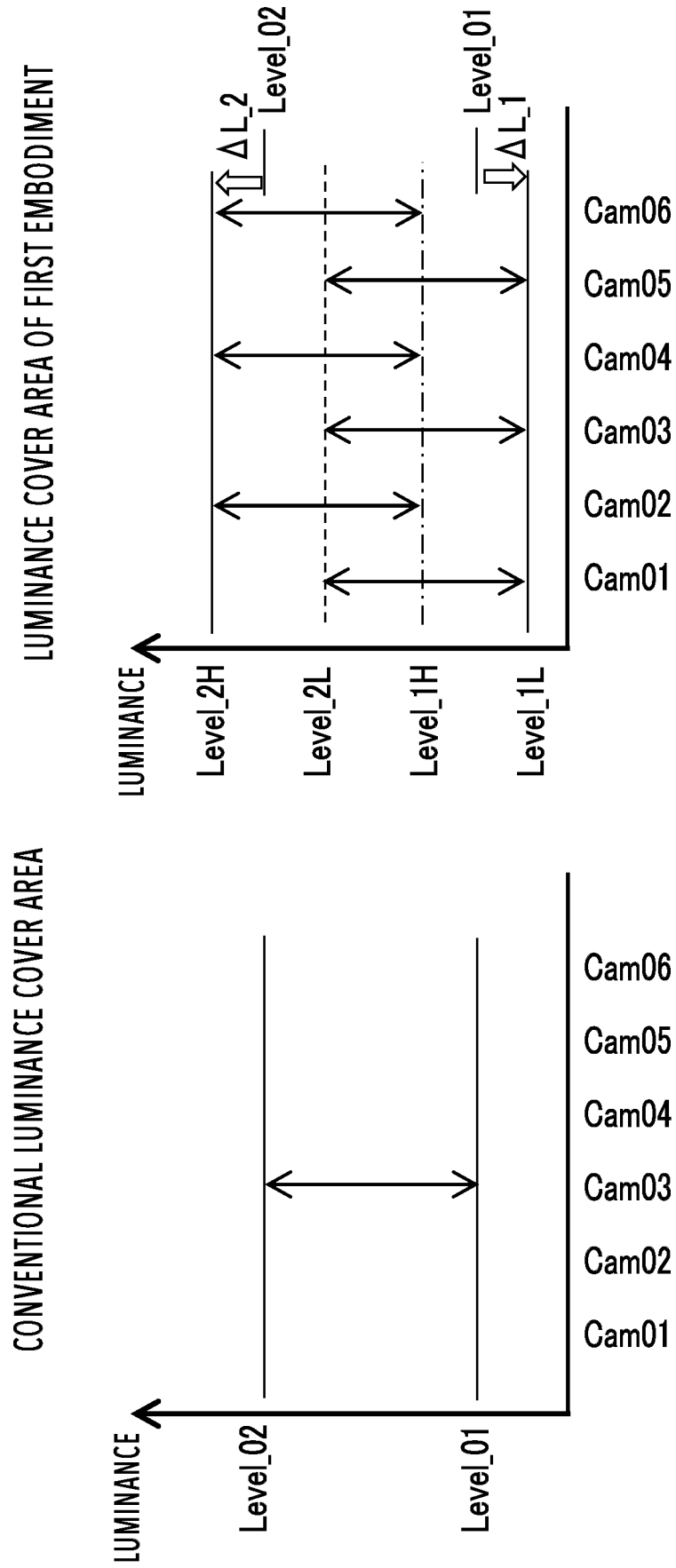

IMAGE PROCESSING SYSTEM, IMAGE PROCESSING METHOD AND STORAGE MEDIUM

FIELD

The present disclosure relates to a technique to generate data relating to an object from captured images.

DESCRIPTION OF THE RELATED ART

A technique is attracting attention that generates virtual viewpoint contents including a virtual viewpoint image from a camera not existing actually by performing synchronous image capturing with a plurality of cameras installed at different positions and using a plurality of images obtained by the image capturing.

In Laurentini (A. Laurentini, "The visual hull concept for silhouette-based image understanding", IEEE Transactions Pattern Analysis and Machine Intelligence, Vol. 16, No. 2, pp. 150-162, February 1994), a technique relating to generation of a three-dimensional model by the visual hull method by extracting silhouette masks of a target object from a plurality of images is described.

SUMMARY

Image capturing from a plurality of viewpoints is performed in a variety of environments. For example, in image capturing or the like in a combination of a location where light from outside is strong, such as a location under the scorching sun where weather is fine, and the shade, in a combination of a strong illumination at night and a portion that is not illuminated, under a condition of strong backlight and the like, there is a case where the dynamic range becomes very large as an object. In a case where the dynamic range is large, it is difficult to acquire a foreground image or a texture without overexposure or shadow-detail loss (black defects) from the bright portion or the dark portion of a captured image. That is, in a case of an object whose dynamic range of brightness is wide or an image capturing environment in which the dynamic range of brightness is wide, it is not possible to appropriately generate data relating to an object from captured images.

The present disclosure provides a technique to appropriately generate data relating to an object even in a case of an object whose dynamic range of brightness is wide or an image capturing environment in which the dynamic range of brightness is wide.

Means for Solving Problem

The present disclosure is an image processing system including: a first acquisition unit configured to acquire a foreground mask from a captured image acquired by capturing an object with an image capturing unit whose exposure value is set relatively higher or lower than that of another image capturing unit; a second acquisition unit configured to acquire an inappropriate area mask by detecting an area whose exposure value is inappropriate in the captured image; and a generation unit configured to generate shape data representing a three-dimensional shape of the object based on the foreground mask and the inappropriate area mask.

Further features of the present disclosure will become apparent from the following description of exemplary embodiments with reference to the attached drawings.

BRIEF DESCRIPTION OF THE DRAWINGS

FIG. 5A and FIG. 5B are each a diagram showing an example of a relationship between each camera and a luminance cover area;

DESCRIPTION OF THE EMBODIMENTS

Before explaining embodiments of the present disclosure, generation of a three-dimensional model (three-dimensional shape data) by the visual hull method is explained.

Figure 1A:
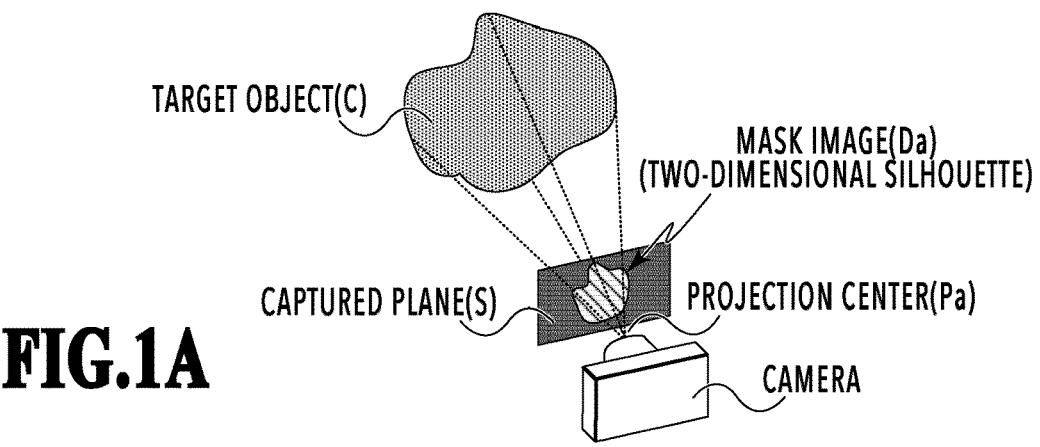
FIG. 1A to FIG. 1C are diagrams showing a generation method of a three-dimensional model by the visual hull method.
Figure 1B:
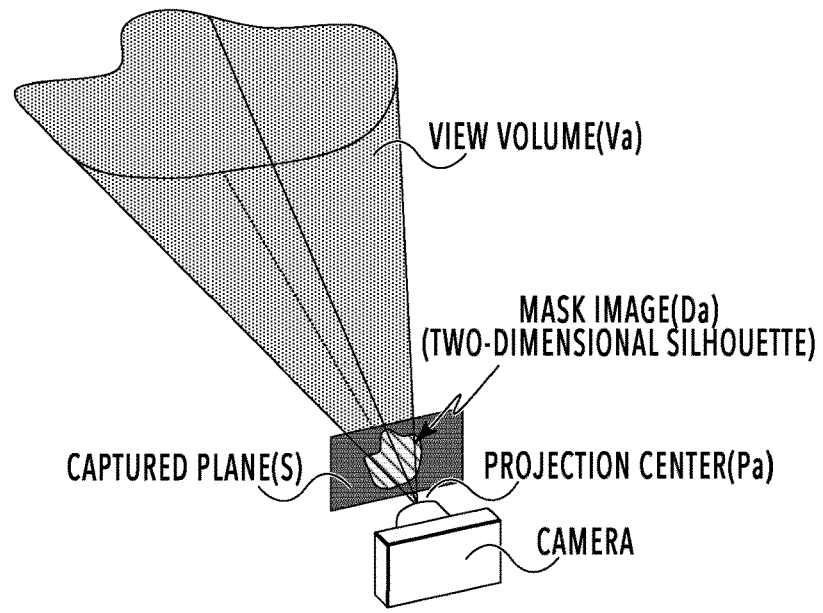
Figure 1C:
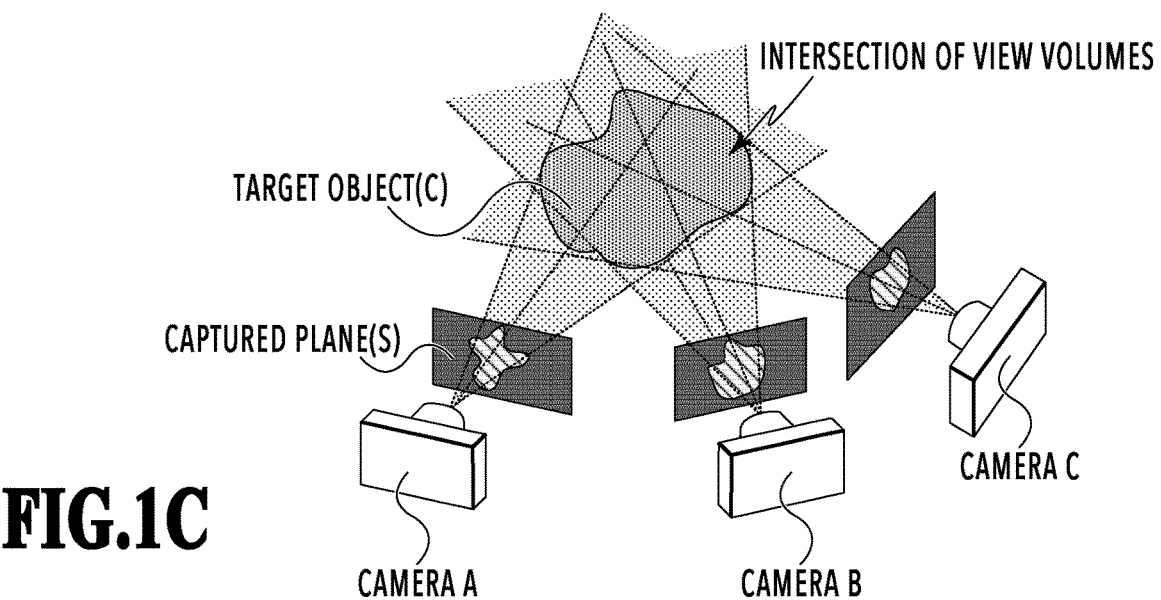

The visual hull method is, for example, a representative method of generating a three-dimensional model based on captured images acquired by performing image capturing with a plurality of cameras and in recent years, many systems based thereon are developed. FIG. 1A to FIG. 1C are diagrams showing basic principles of the visual hull method. FIG. 1A is a diagram in a case where a certain target object (C) is captured by a camera, which is an image capturing apparatus. As shown in FIG. 1A, by capturing the target object (C) with a camera, a mask image (Da) is obtained that represents a two-dimensional silhouette (foreground area) indicating the target object on a captured plane (S) of the captured image captured by the camera. FIG. 1B is a diagram showing a pyramidal form that spreads into a three-dimensional space so as to extend from a projection center (Pa) of the camera and pass each point on the contour of the mask image (Da). This pyramidal form is called a view volume Va by the camera. The image capturing apparatus may further has functions other than the function of the camera.

FIG. 1C is a diagram showing the way a three-dimensional shape of an object (three-dimensional model of foreground) is found from a plurality of view volumes. As shown in FIG. 1C, from the foreground areas based on the images synchronously captured by a plurality of cameras (in the example shown in FIG. 1C, three cameras A, B, and C) whose positions are different, a plurality of view volumes for each camera is found. The visual hull method is a method of finding a three-dimensional model of the foreground of the target object by finding an intersection (common area) of the view volumes of a plurality of cameras.

In the present specification, hereinafter, what corresponds to the mask image Da is represented as a silhouette mask and the portion that indicates that the object is located on the silhouette mask is taken to be "1" and the portion that indicates that the object is not located on the silhouette mask is taken to be "0".

In the following, aspects for embodying the present disclosure are explained by using the drawings. Note that the components described in embodiments are merely exemplary and not intended to limit the scope of the present disclosure to those. Further, all combinations of the components explained in the embodiments are not necessarily indispensable to the solution for solving the problem and there can be various modifications and alterations.

First Embodiment

Figure 2:
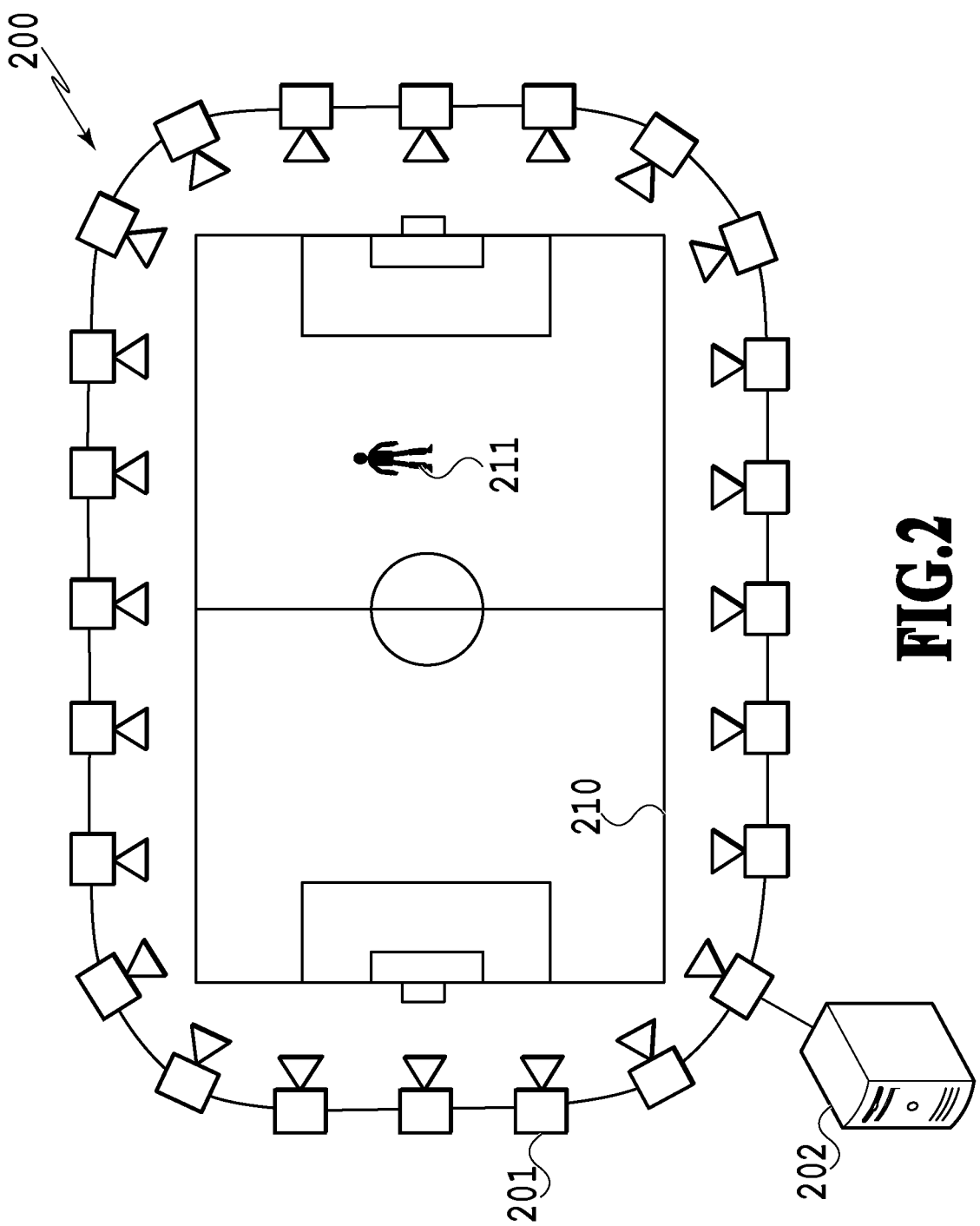
FIG. 2 is a diagram showing a schematic configuration of an image processing system.

FIG. 2 is a diagram explaining the schematic configuration of an image processing system (hereinafter, referred to as system) 200 of the present embodiment. The system 200 has cameras 201, which are a plurality of image capturing apparatuses, and an image processing apparatus 202. The plurality of the cameras 201 is arranged side by side around a field 210 of a sports stadium. The plurality of the cameras 201 is configured so as to capture the field 210 of the sports stadium from a plurality of viewpoints by the plurality of the cameras 201. It is assumed that on the field 210 of the sports stadium, a game, for example, such as soccer, is played and on the field 210 of the sports stadium, a person 211 who is an object of the foreground exists. The object is a specific person, for example, such as a player, a manager, and a referee. The object may also be an object whose image pattern is determined in advance, such as a ball or a goal. Further, the object may also be a moving object or a still object.

Figure 3:
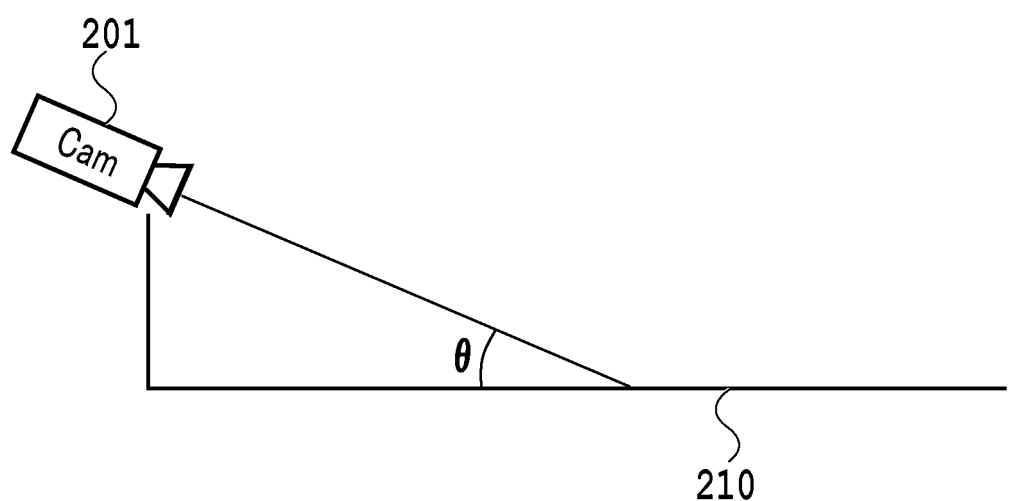
FIG. 3 is a diagram explaining an orientation of a camera.

FIG. 3 is a diagram explaining the orientation of the camera. The camera 201 is installed above the field 210 (bottom surface of the image capturing space) of the sports stadium so that the line-of-sight direction of the camera and the field 210 of the sports stadium form a predetermined angle θ (for example, five degrees to 80 degrees). It is possible for the camera thus installed to have a bird's-eye view of the field 210 from a high position above the field 210.

The installation angle θ of the camera 201 does not need to the same value for all the cameras and may also be a value largely different for each individual camera 201. Alternatively, it may also be possible to divide the plurality of cameras into a plurality of states in which the cameras are arranged side by side, such as a state where the tripod attached to each camera is stretched to its second shortest length, a state where the tripod is stretched to its third shortest length, and a state where the tripod is stretched to its fourth shortest length.

Each camera 201 comprises image processing and input/output hardware for data transfer. The cameras 201 are connected so as to form, for example, a ring-type network by using a network cable and configured so as to sequentially transfer image data to the next camera via the network.

That is, the camera 201 is configured to transfer the received image data to the next camera along with the image data obtained by performing image capturing with the camera 201 itself. One of the cameras 201 is connected with the image processing apparatus 202. The image data obtained by each camera 201 is transferred up to the image processing apparatus 202 via the network and the cameras 201 after being subjected to predetermined information processing (image processing) in a camera processing unit 710 of a camera adaptor (not shown schematically) provided in each camera 201, whose details will be described later. In a main body processing unit 720 of the image processing apparatus 202, processing to generate a virtual viewpoint image is performed by using the received image data.

Exposure setting of the plurality of the cameras 201 possessed by the system 200 is explained by using FIG. 4, FIG. 5A and FIG. 5B, and FIG. 6A and FIG. 6B.

Figure 4:
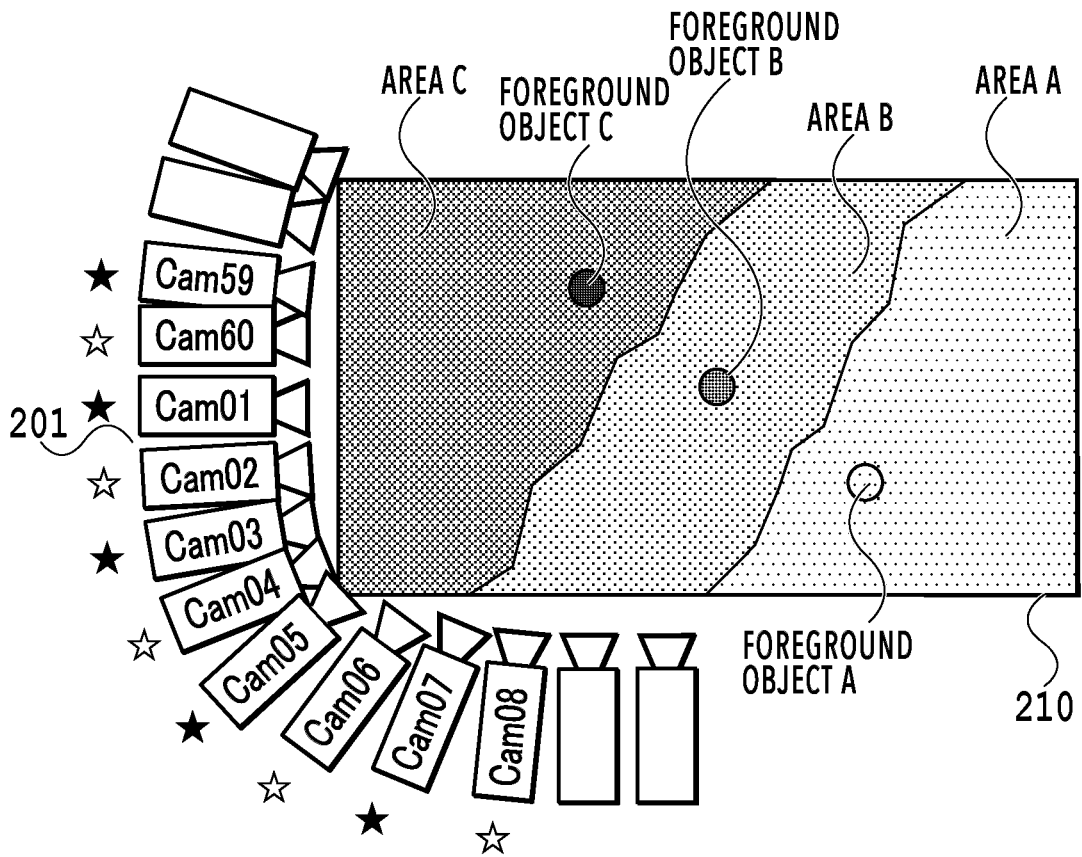
FIG. 4 is a diagram explaining cameras and image capturing targets.

FIG. 4 is a diagram explaining cameras and image capturing targets. FIG. 4 shows a part of the plurality of the cameras 201 possessed by the system 200. Here, among the 60 cameras 201 Cam 01, . . . , Cam 60 possessed by the system 200, the six cameras 201 of Cam01 to Cam06 are explained as an example. The number of cameras 201 possessed by the system 200 is not limited to 60 and may be less than 60 or may be 61 or more.

In the system 200, each of the plurality of the cameras 201 is configured so as to capable of changing the exposure setting. It is assumed that the camera to which a solid black star mark is attached is a camera (hereinafter, referred to as L cameral) that is instructed to perform control in a direction in which the exposure value is increased from the normal exposure value and whose exposure value is set relatively higher than the exposure value of the other cameras and whose exposure value is set so as to cover at least a low-luminance portion. Here, it is assumed that the cameras Cam01, Cam03, Cam05, Cam07, . . . , Cam59 are the L cameras. It is assumed that the camera to which a solid white star mark is attached is a camera (hereinafter, referred to as H camera) that is instructed to perform control in a direction in which the exposure value is reduced from the normal exposure value and whose exposure value is set relatively lower than the exposure value of the other cameras and whose exposure value is set so as to cover at least a high-luminance portion. Here, it is assumed that the cameras Cam02, Cam04, Cam06, Cam8, . . . , Cam60 are the H cameras.

In the system 200, the L cameras and the H cameras are arranged alternately in the transverse direction. The arrangement of the cameras is not limited to this. The L cameras and the H cameras may be arranged dispersedly in another form as needed. For example, the L cameras and the H cameras may be arranged in a plurality of vertical rows and the L cameras and the H cameras are arranged separately in each row, or the L cameras and the H cameras are arranged alternately or randomly in the same row, and what is required is to appropriately arrange the L cameras and the H cameras dispersedly.

Here, a relationship between the H camera and the H camera, and the bright and dark areas within the image capturing area is explained. In the present embodiment, a case is explained as an example where weather is fine and on the field, a bright area because of receiving strong sunlight and a dark area because of being shadowed by a building exist.

As shown in FIG. 4, the area corresponding to the brightest area on the field 210 is taken as an area A, the area corresponding to the darkest portion is taken as an area C, and the area corresponding to neither the area A nor the area C is taken as an area B. An object existing in each of the area A, the area B, and the area C is taken as a foreground object A, a foreground object B, and a foreground object C, respectively. Hereinafter, the portion corresponding to the foreground object in the image captured by the camera is simply referred to as "foreground". Further, it is assumed that the distinction among A, B, and C also applies later as it is. The cameras Cam01 to Cam06 of the cameras 201 are installed so as to include the necessary target area on the filed within the viewing angle and the information relating to the three-dimensional position and orientation of each camera is acquired in advance.

FIG. 5A and FIG. 5B are each a diagram showing an example of a luminance range that covers in a case where the field 210 is captured by Cam01 to Cam06 of the cameras 201 shown in FIG. 4. In FIG. 5A and FIG. 5B, the magnitude of the luminance is indicated in the vertical direction and it is indicated that the higher in the upward direction, the higher the luminance is.

FIG. 5A is a diagram showing a conventional example in a case where the field 210 is captured by the cameras whose exposure is set to the same value. In the conventional example, as shown in FIG. 5A, all the luminance ranges of Cam01 to Cam06 are the same, that is, Level_01 to Level_02.

FIG. 5B is a diagram showing an example of the present embodiment, in which the field 210 is captured by the cameras, which are set alternately as the L camera and the H camera. In the example of the present embodiment, as shown in FIG. 5B, for Cam01, Cam03, and Cam05, the exposure value is reduced by $\Delta L\_1$, and therefore, the luminance range of Cam01, Cam03, and Cam05 is Level_1L to Level_2L. For Cam02, Cam04, and Cam06, the exposure value is increased by $\Delta L\_2$, and therefore, the luminance range of Cam02, Cam04, and Cam06 is Level1_1H to Level_2H. By setting the cameras as described above and performing HDR integration for the images acquired by the L cameras and the H cameras at the time of foreground shape estimation and coloring, it is possible to generate a virtual viewpoint image in the luminance range wider than the conventional luminance range Level_01 to Level_02 by $\Delta L\_1+\Delta L\_2$. It is possible to change the magnitude of $\Delta L\_1$ and $\Delta L\_2$ appropriately.

Figure 6A:
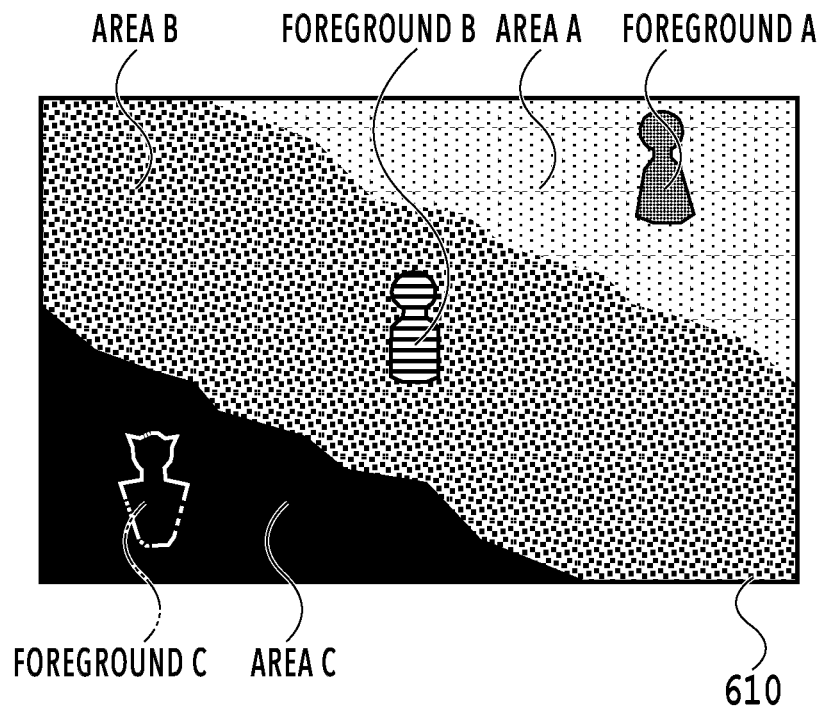
FIG. 6A and FIG. 6B are each a diagram showing an example of an image captured by a camera with a predetermined exposure value.
Figure 6B:
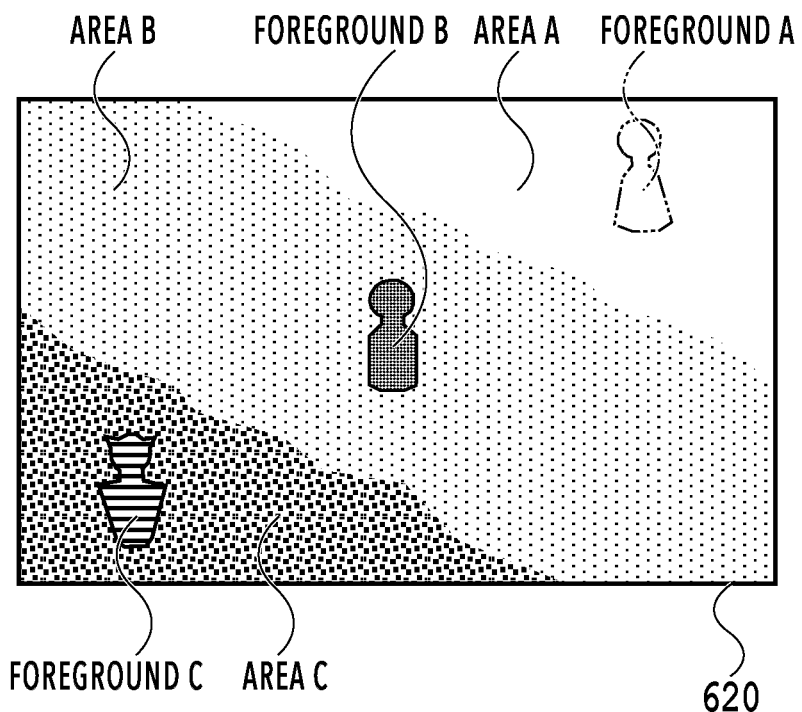

FIG. 6A and FIG. 6B are each a diagram showing an example of an image acquired by capturing the field 210 by Cam01 of the cameras 210 shown in FIG. 4. FIG. 6A is a diagram showing an example of an image by the camera whose exposure value is set lower than the normal value, that is, by the H camera described above. In the area C of an image 610, which corresponds to the area C shown in FIG. 4, the foreground C and the area C are deep black and it is not possible to distinguish the foreground C from the area C and the foreground C and the area C are in the shadow-detail loss (black defects) state or in the state close thereto. In the areas A and B of the image 610, which correspond to the areas A and B shown in FIG. 4, the foreground A and the foreground B do no become deep black or pure white and it is possible to distinguish the foreground A and the foreground B from the area A and the area B, respectively, and the areas A and B are in the appropriately captured state. In the image 610 such as this, the shape of the foreground C and the texture information in the area C are incomplete or low in quality.

FIG. 6B is a diagram showing an example of an image by the camera whose exposure value is set higher than the normal value, that is, by the L camera described above. In the area A of an image 620, which corresponds to the area A shown in FIG. 4, the foreground A and the area A are pure white and it is not possible to distinguish the foreground A from the area A and the foreground A and the area A are in the overexposure state or in the state close thereto. In the areas B and C of the image 620, which correspond to the areas B and C shown in FIG. 4, the foreground B and the foreground C do no become pure white or deep black and it is possible to distinguish the foreground B and the foreground C from the area B and the area C, respectively, and the areas A and B are in the appropriately captured state. In the image 620 such as this, the shape of the foreground A and the texture information in the area A are incomplete or low in quality.

In the present specification, the area like the area C in FIG. 6A is an area whose exposure value is inappropriate resulting from the approximate shadow-detail loss in the shadow-detail loss state or in the state close thereto, and therefore, the area like the area C in FIG. 6A is referred to as an approximate shadow-detail loss exposure inappropriate area (hereinafter, referred to as NGL area). Further, the area like the area A in FIG. 6B is an area whose exposure value is inappropriate resulting from the approximate overexposure in the overexposure state or in the state close thereto, and therefore, the area like the area A in FIG. 6B is referred to as an approximate overexposure exposure inappropriate area (hereinafter, referred to as NGH area).

<Configuration and Processing of Image Processing Apparatus>

Figure 7:
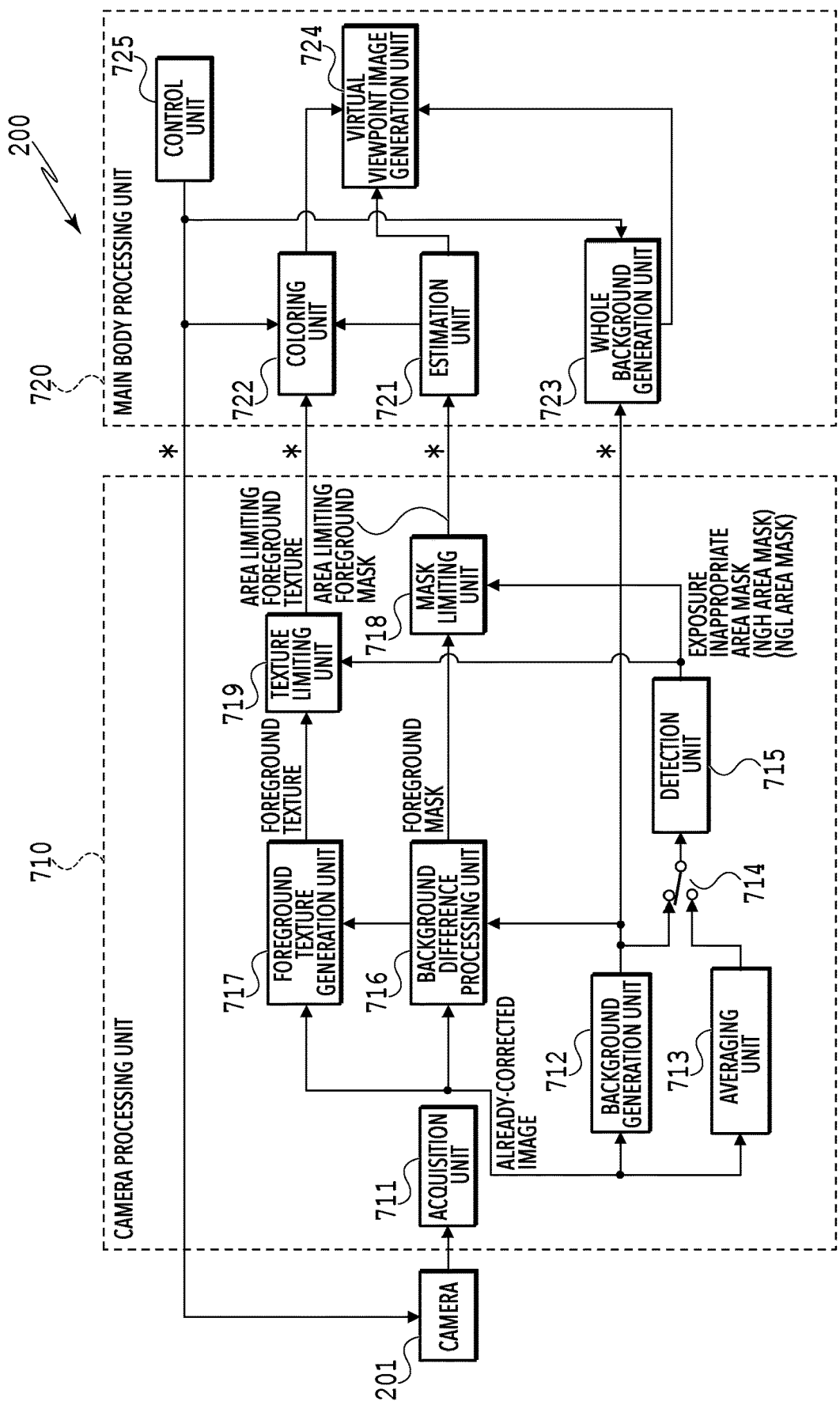
FIG. 7 is a block diagram including internal configurations of a camera processing unit and a main body processing unit.
Figure 8A:
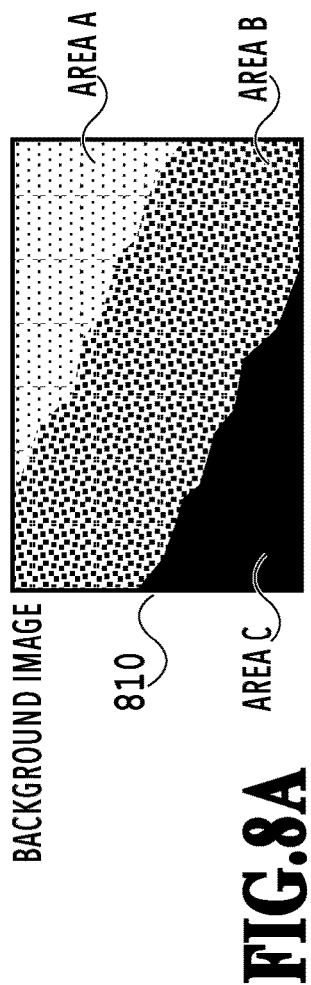
FIG. 8A and FIG. 8B are each a diagram showing an image example based on a captured image of an H camera.
Figure 8B:
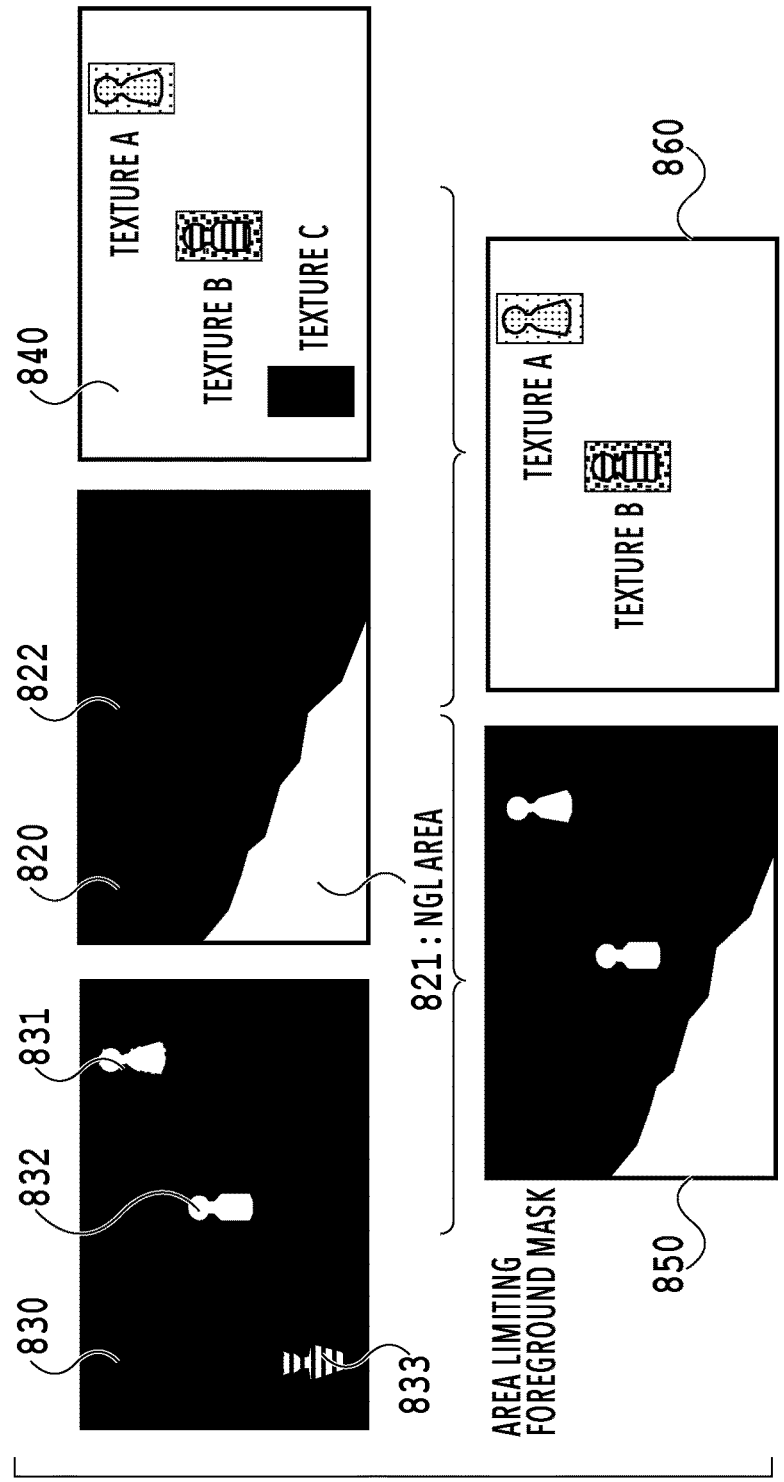
Figure 9A:
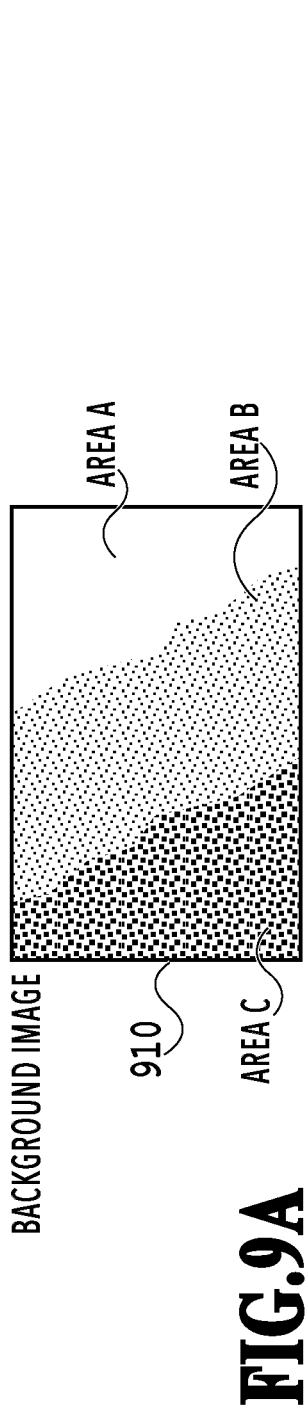
FIG. 9A and FIG. 9B are each a diagram showing an image example based on a captured image of an L camera.
Figure 9B:
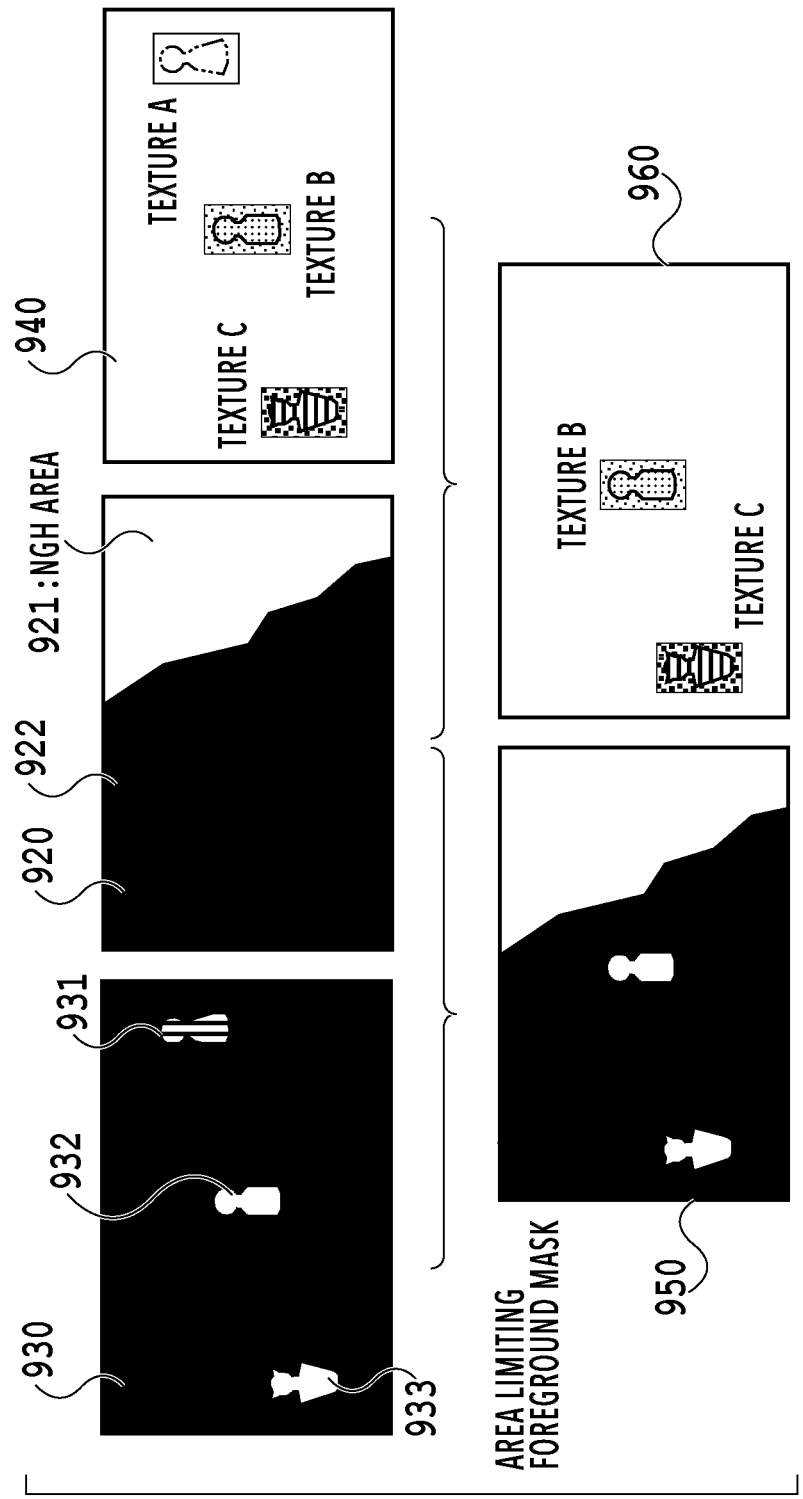

The internal configurations of the camera processing unit 710 of the camera adaptor and the main body processing unit 720 of the image processing apparatus 202, which are possessed by the system 200, are explained by using FIG. 7. Further, the processing contents of each block in FIG. 7 are explained in order by using FIG. 8A and FIG. 8B, and FIG. 9A and FIG. 9B. FIG. 8A and FIG. 8B are each a diagram showing an example of an image by the H camera and FIG. 9A and FIG. 9B are each a diagram showing an example of an image by the L camera.

FIG. 7 is a block diagram including the internal configurations of the camera processing unit 710 of the camera adaptor corresponding to the camera 201 and the main body processing unit 720 of the image processing apparatus 202, which are possessed by the system 200.

The system 200 has the camera 201, the camera processing unit 710, and the main body processing unit 720. In the system 200, the camera processing unit 710 exists for each camera system. That is, the system 200 has the camera processing units 710 of the camera adaptor corresponding to the number of cameras 201. In the system 200, the one main processing unit 720 of the image processing apparatus 202 exists. In FIG. 7, the portion indicated by the asterisk means connection by the ring-type network shown in FIG. 2.

That is, the camera 201 and the camera processing unit 710 in FIG. 7 indicate image capturing for each camera 201 and the flow of processing, and the main body processing unit 720 in FIG. 7 indicates the flow of processing whose target is all the connected cameras 201.

The camera processing unit 710 extracts several pieces of image information, whose details will be described later, from the image data acquired by the camera 201 performing image capturing. The main body processing unit 720 generates virtual viewpoint image data by receiving the image information extracted by the camera processing unit 710 and performing shape estimation and coloring.

The image processing in the present embodiment is performed by hardware, such as ASIC and FPGA, incorporated in the camera adaptor and the image processing apparatus 202. ASIC is an abbreviation of application specific integrated circuit. FPGA is an abbreviation of field programmable gate array. Each module shown in FIG. 7 is mounted inside ASIC and FPGA as hardware.

The camera processing unit 710 has an image acquisition unit 711, a background image generation unit 712, a frame averaging processing unit 713, a switch 714, an exposure inappropriate area detection unit 715, a background difference processing unit 716, and a foreground texture generation unit 717. The camera processing unit 710 further has an area limiting M processing unit 718 and an area limiting T processing unit 719.

The main body processing unit 720 has a shape estimation processing unit (hereinafter, referred to as estimation unit) 721, a coloring processing unit (hereinafter, referred to as coloring unit) 722, a whole background generation unit 723, a virtual viewpoint image generation unit 724, and a system control unit (hereinafter, referred to as control unit) 725.

The control unit 725 controls the camera 201, the camera processing unit 710, and the main body processing unit 720. The control unit 725 sends an exposure setting command to the camera 201.

Upon receipt of the exposure setting command from the control unit 725, the exposure value of the camera 201 is set so as to have the luminance range corresponding to the H camera or the L camera described above in accordance with the exposure setting command. The image data on the captured image acquired by the camera 201 set as the H camera or the L camera performing image capturing is output to the image acquisition unit (hereinafter, referred to as acquisition unit) 711.

The acquisition unit 711 acquires the image data on the captured image captured by the camera 201. The captured image is a still image captured continuously in time or an image, such as a frame of a moving image. Hereinafter, the image of one frame among input images continuous in time, which is input to the acquisition unit 711, is called a frame image. In the acquisition unit 711, for the acquired frame image, preprocessing, such as correction of shake or vibration of the image, correction of distortion of the image, for example, lens distortion, and color adjustment and gamma adjustment, is performed and image data on the preprocessing-subjected image (hereinafter, referred to as already-corrected image) is generated. The image data on the already-corrected image is output to the background image generation unit (hereinafter, referred to as background generation unit) 712, the frame averaging processing unit (hereinafter, referred to as averaging unit) 713, the background difference processing unit 716, and the foreground texture generation unit 717.

The background generation unit 712 generates image data on the background image (hereinafter, also referred to as background data) in order while removing the foreground appropriately from the image data on the already-corrected image input from the acquisition unit 711. The background generation unit 712 generates, in a case where the corresponding camera 201, for example, Cam01 shown in FIG. 4 is set as the H camera, image data on a background image 810 shown in FIG. 8A. The background generation unit 712 generates, in a case where the corresponding camera 201, for example, Cam02 shown in FIG. 4 is set as the L camera, image data on a background image 910 shown in FIG. 9A. As the generation method of a background image, for example, a publicly known technique, for example, such as the technique described in Japanese Patent Laid-Open No. 2001-043458, is used. The image data on the background image is output to the exposure inappropriate area detection unit (hereinafter, referred to as detection unit) 715 via the switch 714. Further, the image data on the background image is output to the background difference processing unit 716.

The averaging unit 713 generates image data on an average image obtained by averaging the whole or part of the image data on the already-corrected images during a predetermined period, which is input from the acquisition unit 711, in the direction of time. The predetermined period is a period during which image data on the already-corrected images corresponding to a predetermined number of frames, for example, such as 20 frames and 30 frames, is input and a period that is set in advance.

The detection unit 715 takes in the image data on the background image or the average image via the switch 714. Then, the detection unit 715 detects an area whose exposure value is inappropriate by analyzing the pixel value of the background image or the average image of the image data that is taken in and generates data on an exposure inappropriate area mask that masks the exposure inappropriate area. The data on the exposure inappropriate area mask is output to the area limiting M processing unit (hereinafter, referred to as mask limiting unit) 718 and the area limiting T processing unit (hereinafter, referred to as texture limiting unit) 719. It is possible for the switch 714 to switch the connection destination thereof between the background generation unit 712 and the averaging unit 713 and the connection destination may be switched for the whole frame, for each area, or for each pixel.

Specifically, in a case where the corresponding camera 201 is set as the H camera, the detection unit 715 detects the portion whose pixel value is less than or equal to a predetermined lower limit threshold value as an approximate shadow-detail loss exposure inappropriate area. The detection unit 715 generates data on an approximate shadow-detail loss exposure inappropriate area mask (hereinafter, also referred to as NGL area mask), which is a second exposure mask, corresponding to the detected approximate shadow-detail loss exposure inappropriate area. In a case where the corresponding camera 201 is set as the L camera, the detection unit 715 detects the portion whose pixel value exceeds a predetermined upper limit threshold value (different from the lower limit threshold value and the threshold value greater than the lower limit threshold value) as an approximate overexposure exposure inappropriate area. The detection unit 715 generates data on an approximate overexposure exposure inappropriate area mask (hereinafter, also referred to as NGH area mask), which is a first exposure mask, corresponding to the detected approximate overexposure exposure inappropriate area. That is, the detection unit 715 has a function to generate data on a specific mask.

The data on the NGL area mask and the NGH area mask is represented by a binary map in which the exposure value inappropriate area is 1 (white) and the exposure value appropriate area other than the exposure value inappropriate area is 0 (black). Further, it is necessary to prevent the map from becoming an area dispersed minutely more than necessary by expansion/reduction processing and at the same time, keep the map in a state where the map is expanded to a certain extent in order to improve certainty. It may also be possible for the detection unit 715 to perform the expansion/reduction processing for the binary map created by, for example, the determination of whether or not the pixel value is within the range between the upper limit value and the lower limit value. By performing this processing, it is possible to remove noise.

In FIG. 7, the connection destination of the switch 714 is the background generation unit 712 and in the detection unit 715, processing based on the image data on the background image generated in the background generation unit 712 is performed.

In a case where the corresponding camera 201, for example, Cam01 shown in FIG. 4 is set as the H camera, the detection unit 715 generates data on an NGL area mask 820 shown in FIG. 8B. The data on the NGL area mask 820 is data on a mask represented by a binary map in which an NGL area 821 is 1 (white) and an exposure value appropriate area 822 other than the NGL area 821 is 0 (black).

In a case where the corresponding camera 201, for example, Cam02 shown in FIG. 4 is set as the L camera, the detection unit 715 generates data on an NGH area mask 920 shown in FIG. 9B. The data on the NGH area mask 920 is data on a mask represented by a binary map in which an NGH area 921 is 1 (white) and an exposure value appropriate area 922 other than the NGH area 921 is 0 (black).

On the other hand, the background difference processing unit 716 generates data on a mask image (foreground mask) that masks the foreground by performing foreground/background separation processing (background difference processing) by using the already-corrected image generated by the acquisition unit 711 and the image data on the background image generated by the background generation unit 712. The data on the foreground mask is output to the foreground texture generation unit 717 and the mask limiting unit 718. In a case where the corresponding camera 201, for example, Cam01 shown in FIG. 4 is set as the H camera, the background difference processing unit 716 generates data on a foreground mask 830 shown in FIG. 8B. The data on the foreground mask 830 has a foreground mask A (two-dimensional silhouette of foreground A) 831, a foreground mask B (two-dimensional silhouette of foreground B) 832, and a foreground mask C (two-dimensional silhouette of foreground C) 833 indicating the foreground A, the foreground B, and the foreground C, respectively. In a case where the corresponding camera 201, for example, Cam02 shown in FIG. 4 is set as the L camera, the background difference processing unit 716 generates data on a foreground mask 930 shown in FIG. 9B. The data on the foreground mask 930 has a foreground mask A (two-dimensional silhouette of foreground A) 931, a foreground mask B (two-dimensional silhouette of foreground B) 932, and a foreground mask C (two-dimensional silhouette of foreground C) 933 indicating the foreground A, the foreground B, and the foreground C, respectively.

The foreground texture generation unit 717 generates a foreground texture by using the already-corrected image generated by the acquisition unit 711 and the data on the foreground mask generated by the background difference processing unit 716. The foreground texture generation unit 717 generates the foreground texture by extracting a texture from the already-corrected image with respect to a rectangular area including the foreground of the foreground mask and the portion in the vicinity thereof. The foreground texture refers to, for example, color information on R, G, and B of each pixel in the area corresponding to the foreground indicated by the data on the foreground mask. The foreground texture is output to the texture limiting unit 719.

In a case where the corresponding camera 201, for example, Cam01 shown in FIG. 4 is set as the H camera, the foreground texture generation unit 717 generates a foreground texture 840 shown in FIG. 8B. The foreground texture 840 has a foreground texture A (also referred to as texture A) of the rectangular area including the foreground A, a foreground texture B (also referred to as texture B) of the rectangular area including the foreground B, and a foreground texture C (also referred to as texture C) of the rectangular area including the foreground C. In a case of the H camera, the two-dimensional silhouette of the foreground C and the foreground texture C exist in the NGL area of the NGL area mask and both are in the shadow-detail loss state or in the state close thereto, and therefore, both are in the state where the possibility that the quality of the foreground mask C and the foreground texture C is insufficient is strong.

In a case where the corresponding camera 201, for example, Cam02 shown in FIG. 4 is set as the L camera, the foreground texture generation unit 717 generates a foreground texture 940 shown in FIG. 9B. The foreground texture 940 has the texture A of the rectangular area including the foreground A, the texture B of the rectangular area including the foreground B, and the texture C of the rectangular area including the foreground C. The foreground mask A and the foreground texture A exist in the NGH area and both are in the overexposure state or in the state close thereto, and therefore, both are in the state where the possibility that the quality of the foreground mask A and the foreground texture A is insufficient is strong. The foreground texture is output to the texture limiting unit 719.

The mask limiting unit 718 and the texture limiting unit 719 perform processing to mask the portion whose quality is insufficient in view of the situation as described previously.

The mask limiting unit 718 calculates the logical sum of the foreground mask whose foreground is 1 (white) and the exposure inappropriate area mask whose exposure inappropriate area is 1 (white) and generates an area limiting foreground mask (hereinafter, also referred to as limiting mask) whose foreground and exposure inappropriate area are 1 (white). That is, the mask limiting unit 718 generates a limiting mask including a specific foreground mask, which is obtained by excluding the foreground mask corresponding to the exposure inappropriate area from the foreground mask. The data on the limiting mask is output to the estimation unit 721.

In a case where the corresponding camera, for example, Cam01 shown in FIG. 4 is set as the L camera, the mask limiting unit 718 calculates the logical sum of the data on the NGL area 820 and the foreground mask 830 shown in FIG. 8B and generates data on a limiting mask 850.

In a case where the corresponding camera, for example, Cam02 shown in FIG. 4 is set as the H camera, the mask limiting unit 718 calculates the logical sum of the data on the NGH area 920 and the foreground mask 930 shown in FIG. 9B and generates data on a limiting mask 950.

The texture limiting unit 719 generates an area limiting foreground texture (hereinafter, referred to as limiting texture) including a specific foreground texture, which is obtained by excluding the foreground texture corresponding to the exposure inappropriate area from the foreground texture. The limiting texture is output to the coloring unit 722.

In a case where the corresponding camera 201, for example, Cam01 shown in FIG. 4 is set as the H camera, the texture limiting unit 719 generates an area limiting texture 860 having the texture A of the rectangular area including the foreground A and the texture B of the rectangular area including the foreground B shown in FIG. 8B. In a case where the corresponding camera, for example, Cam02 shown in FIG. 4 is set as the L camera, the texture limiting unit 719 generates an area limiting texture 960 having the texture B of the rectangular area including the foreground B and the texture C of the rectangular area including the foreground C shown in FIG. 9B.

As described above, each function unit of the camera processing unit 710 generates image information used in the main body processing unit 720, and therefore, the camera processing unit 710 can be said as an image information generation unit.

The estimation unit 721 generates data on a three-dimensional model (foreground shape) of the foreground, which is shape data representing the estimated shape of an object by the visual hull method using the data on a plurality of limiting masks. Detailed estimation processing will be described later. The data on the three-dimensional model of the foreground is output to the coloring unit 722 and the virtual viewpoint image generation unit 724.

The coloring unit 722 generates color data to be assigned to the three-dimensional model (foreground shape) of the foreground of the data generated by the estimation unit 721 based on the limiting texture. The color data is output to the virtual viewpoint image generation unit 724.

The whole background generation unit 723 generates data on the whole of the background image (hereinafter, also referred to as whole background image) based on the data on the background image generated by the background image generation unit 712. The generated data on the whole background image is output to the virtual viewpoint image generation unit 724.

The virtual viewpoint image generation unit 724 generates a foreground image and a background image viewed from a virtual camera at a virtual viewpoint, at which a camera does not exist actually, based on the virtual viewpoint information, the shape data, the color data, and the data on the whole background image and generates data on a virtual viewpoint image by synthesizing them. The virtual viewpoint image generation unit 724 transmits the generated data on the virtual viewpoint image to an end user terminal (not shown schematically). The viewpoint input unit (not shown schematically) of the main body processing unit 720 receives an input of virtual viewpoint information by a user, not shown schematically, via the end user terminal or the virtual camera operation UI, not shown schematically, and outputs the virtual viewpoint information to the virtual viewpoint image generation unit 724. The virtual viewpoint information is information including the time at which a virtual viewpoint image is captured by the virtual camera supposed to be arranged at a virtual viewpoint at which no camera exists actually, the position of the virtual viewpoint (virtual camera), the orientation of the virtual camera, the viewing angle and the focal length of the virtual camera, and the like.

Figure 10:
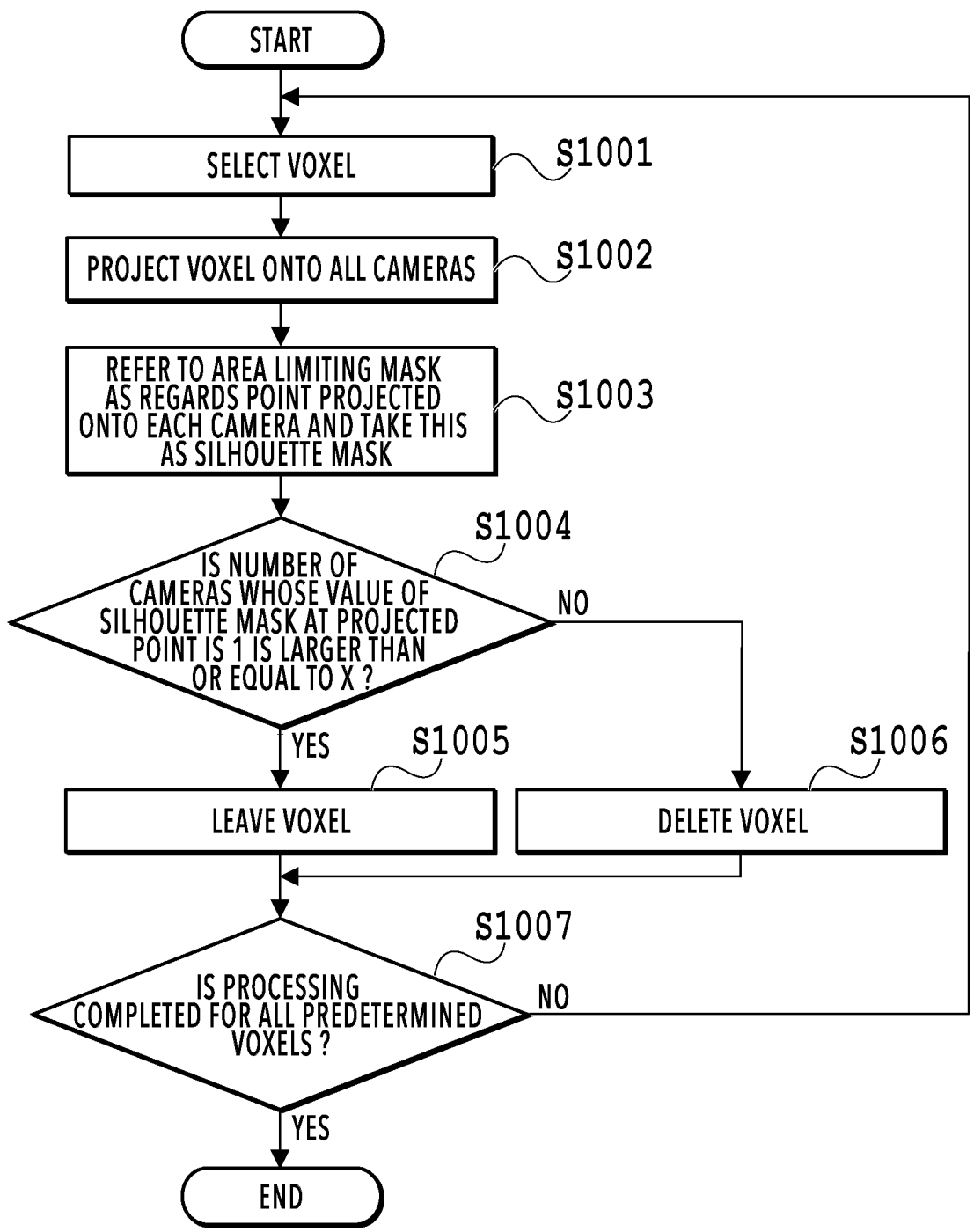
FIG. 10 is a flowchart showing a procedure example of shape estimation processing.

Next, the operation (processing flow) of the estimation unit 721 is explained with reference to FIG. 10. FIG. 10 is a flowchart showing a procedure example of shape estimation processing of a foreground by the estimation unit 721. Symbol "S" in the explanation of each piece of processing means that the step is a step in the flowchart. For each camera, it is assumed that the coordinate position of the camera in the world coordinate space, the orientation (horizontal, vertical) of the camera, and the camera parameters relating to the focal length and the image center are set. It is assumed that the estimation unit 721 has acquired in advance the camera parameters. Further, it is assumed that the data on the frame image acquired by performing image capturing with each camera has been acquired in advance. It is assumed that the estimation unit 721 has extracted in advance the target silhouette from the data on the frame image acquired by performing synchronous image capturing. Further, it is assumed that the estimation unit 721 has generated in advance voxel data obtained by finding the target visual hull in the voxel format by the visual hull method. The voxel data is, for example, in the scene example shown in FIG. 4, data corresponding to the foreground object A, the foreground object B, and the foreground object C.

First, at S1001, the estimation unit 721 selects a processing-target voxel (hereinafter, also referred to as voxel of interest) in order from the generated voxel data. The order of selecting the voxel of interest is not limited as long as it is possible to select all the voxels in order. For example, it may also be possible to select the voxel in order from the voxel nearest to the camera, or select the voxel in order from the voxel near to the center position of the world coordinates.

At S1002, the estimation unit 721 projects the position of the voxel selected at S1001 (hereinafter, also referred to as voxel position) onto each camera based on calibration data acquired in advance. Due to this, coordinates indicating at which position on the image captured by each camera the voxel exists are determined.

At S1003, the estimation unit 721 refers to the limiting mask of the data input from the mask limiting unit 718 for all the cameras and takes the referred limiting mask as a silhouette mask.

At S1004, the estimation unit 721 finds the number of cameras whose value of the silhouette mask at the projected point is 1 and determines whether the number of cameras is larger than or equal to a threshold value X (for example, 55 cameras out of 60 cameras) of the number of cameras. That is, the estimation unit 721 totalizes the number of cameras whose value is 1 indicating that the projected point is located on the silhouette mask and determines whether the total number is larger than or equal to the threshold value X. In a case of acquiring the determination results that the number of cameras is larger than or equal to the threshold value X and the determination condition is satisfied (YES at S1004), the estimation unit 721 moves the processing to S1005. In a case of acquiring the determination results that the number of cameras is less than the threshold value X and the determination condition is not satisfied (NO at S1004), the estimation unit 721 moves the processing to S1006.

At S1005, the estimation unit 721 estimates that an object exists at the voxel position of interest and performs processing to leave the voxel of interest.

At S1006, the estimation unit 721 estimates that no object exists at the voxel position of interest and performs processing to delete the voxel of interest itself.

At S1007, the estimation unit 721 determines whether or not the processing is completed for all the predetermined voxels. In a case of determining that there is an unprocessed voxel and all the predetermined voxels are not processed (NO at S1007), the estimation unit 721 moves the processing to S1001 and continues the processing at S1001 to S1007. In a case of determining that there is no unprocessed voxel and all the predetermined voxels are processed (YES at S1007), the estimation unit 721 terminates this flow.

By performing the above-described processing to leave the voxel or delete the voxel for all the voxels, the estimation unit 721 estimates the shape of the foreground (object) by the visual hull method and generates the data on the shape of the foreground (object).

Here, the reason the HDR synthesis in the estimation of the foreground shape is enabled by inputting the exposure appropriate area of the L camera and the exposure appropriate area of the H camera to the estimation unit 721 as the silhouette masks of the visual hull method is explained in the following.

That is, the reason the HDR synthesis is enabled by the visual hull method using the limiting masks 850 and 950, which are mask data, shown in FIG. 8B and FIG. 9B is explained in the following.

Originally, in the visual hull method, the processing to delete the voxel in accordance with the silhouette mask of each camera is performed. In general, in the foreground masks 830 and 930 as shown in FIG. 8B and FIG. 9B, the processing to delete the voxel is performed for the portion of 0 (black).

Note that, in the present embodiment, the exposure values are shifted between the L camera and the H camera in order to apply the HDR synthesis that widens the reproduction width of brightness, and therefore, each produces an area whose exposure value is inappropriate on the contrary and the quality of the foreground mask of the portion becomes insufficient. Specifically, the accuracy of the shape of the mask is insufficient, a portion is missing, an unnecessary portion is attached and so on. Because of this, in a case where the visual hull method is performed by inputting the foreground masks 830 and 930 as in FIG. 8B and FIG. 9B as they are, the quality of the shape estimation of the foreground objects A and C deteriorates.

Consequently, in the present embodiment, as explained so far, the data on the limiting mask is created in order to prevent voxel deletion in each exposure appropriate area from being performed and the visual hull method is performed by inputting the limiting mask data to the estimation unit 721.

For example, in the L camera, the portion of the NGL area corresponding to the area C is taken to be 1 (white), and therefore, the L camera does not substantially participate in the voxel deletion of the portion. Because of this, in the processing to determine the shape of the foreground object C of the area C, the captured image of the L camera, in which the exposure of the portion of the area is inappropriate, is not substantially involved and the processing is performed only by the captured image of the H camera. On the other hand, although a reduction in the number of cameras for forming the shape of this portion is a disadvantageous factor for the shape estimation processing, preventing deterioration by using the mask whose exposure is inappropriate is more advantageous.

Similarly, in the H camera, the portion of the NGH area corresponding to the area A is taken to be 1 (white), and therefore, the H camera does not substantially participate in the voxel deletion of the portion. Because of this, in the processing to determine the shape of the foreground object A of the area A, the captured image of the H camera, in which the exposure of the portion of the area is inappropriate, is not substantially involved and the processing is performed only by the captured image of the L camera. On the other hand, although a reduction in the number of cameras for forming the shape of this portion is a disadvantageous factor for the shape estimation processing, preventing deterioration by using the mask whose exposure is inappropriate is more advantageous.

By the above mechanism, the HDR synthesis is applied to the data by the L camera and the H camera whose installation positions are different at the time of shape estimation.

Consequently, according to the present embodiment, by the configuration of the L camera and the H camera, it is made possible to apply the high dynamic range. Further, it is made possible to implement an apparatus that generates a virtual viewpoint image in which the overexposed portion of the capture image of the L camera and the shadow-detail loss portion of the captured image of the H camera do not affect shape estimation.

The series of processing in the present embodiment functions as a processing flow even in a case where the exposure setting value of the L camera and the H camera is the same value, and is also effective in a case where there is overexposure or shadow-detail loss in a specific camera for some reason.

Second Embodiment

In the first embodiment, the aspect is explained in which the shape estimation processing is performed by using the limiting mask data. In the present embodiment, an aspect is explained in which the shape estimation processing is performed by using data on a foreground mask and an exposure inappropriate area mask.

Figure 11:
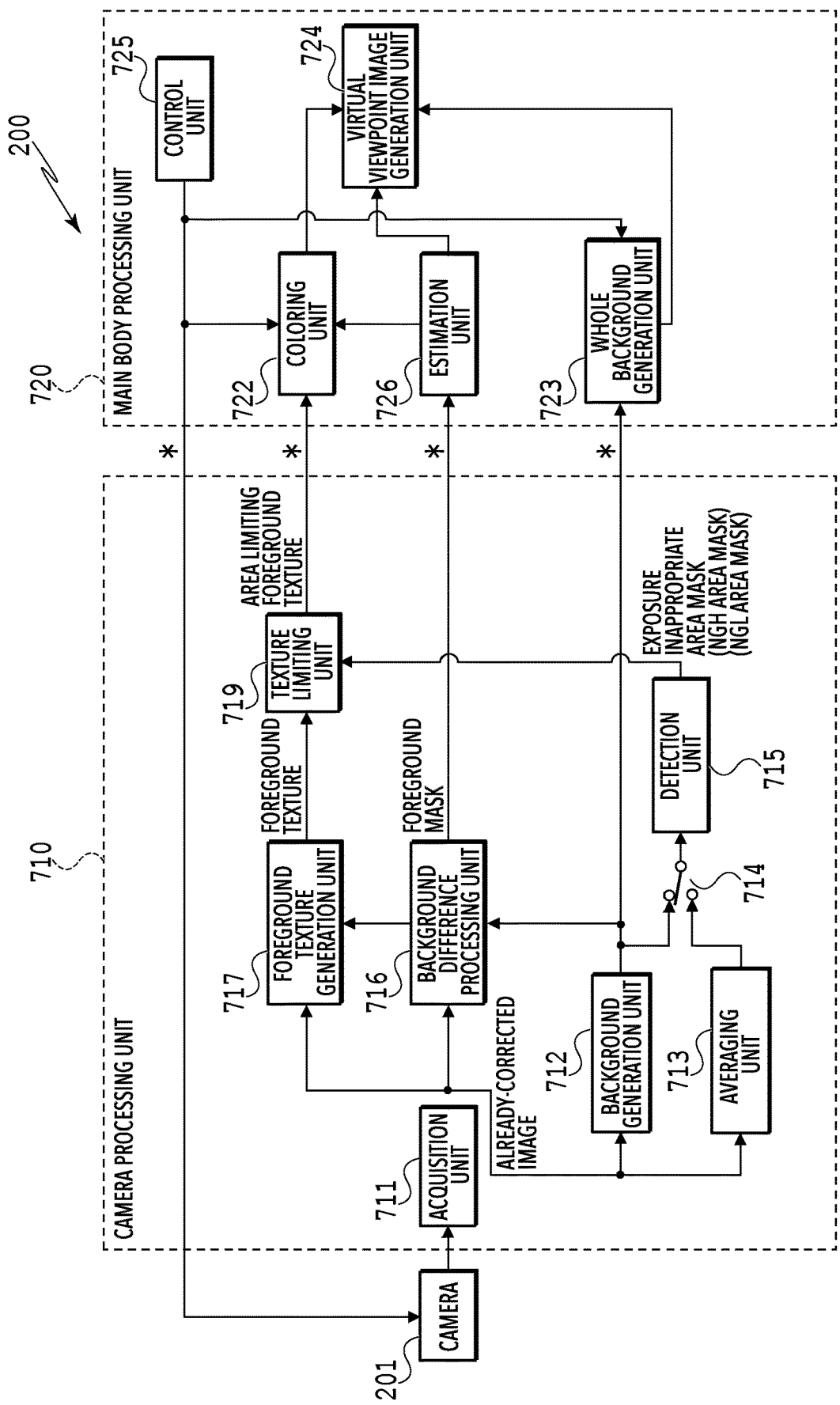
FIG. 11 is a block diagram including internal configurations of a camera processing unit and a main body processing unit.

FIG. 11 is a block diagram including the internal configurations of the camera processing unit 710 and the main body processing unit 720, both possessed by the system 200 of the present embodiment. The same symbols are attached to the same device and the same function unit as those of the system of the first embodiment and explanation thereof is omitted.

In FIG. 11 also, the camera 201 and the camera processing unit 710 indicate image capturing for each camera 201 and the flow of processing and the main body processing unit 720 in FIG. 11 indicates the flow of processing whose target is all the connected cameras.

The camera processing unit 710 extracts several pieces of image information, whose details will be described later, from the image data acquired by the camera 201 performing image capturing. The main body processing unit 720 generates virtual viewpoint image data by receiving the image information extracted by the camera processing unit 710 and performing shape estimation processing and coloring processing.

In the system 200 of the present embodiment, the configuration is such that the mask limiting unit 718 of the first embodiment is removed and the data on the foreground mask generated by the background difference processing unit 716 and the exposure inappropriate area mask generated by the detection unit 715 is input directly to an estimation unit 726.

That is, in the system 200 of the present embodiment, the configuration is such that the limiting masks 850 and 950 shown in FIG. 8B and FIG. 9B are not generated. To the estimation unit 726 of the present embodiment, as a mask (two-dimensional silhouette) for foreground shape estimation, the image information on the foreground masks 830 and 930 and the exposure inappropriate area masks 820 and 920 shown in FIG. 8B and FIG. 9B is sent.

Due to this, the foreground mask located in the range of the exposure inappropriate area is not deleted fixedly on the side of the camera processing unit 710 and it is possible to reevaluate whether or not the foreground mask can be used individually on the side of the main body processing unit 720. For example, in a case of the L camera, the foreground C existing within the NGL area 821 of the exposure inappropriate area mask 820 in FIG. 8B is not deleted on the side of the camera processing unit 710 and the foreground C is evaluated on the side of the main body processing unit 720 and the processing in accordance with the evaluation results is performed.

As a result of that, in a case where it is determined (evaluated) that the foreground located in the exposure inappropriate area can be used for the shape estimation of the three-dimensional model of the foreground, the estimation unit 726 generates data on the estimated three-dimensional model (foreground shape) of the foreground by also using the foreground located in the exposure inappropriate area. In a case where it is determined (evaluated) that the foreground located in the exposure inappropriate area cannot be used for the shape estimation of the three-dimensional model of the foreground, the estimation unit 726 deletes the foreground located in the exposure inappropriate area. The deletion referred to here is calculating the logical sum of the foreground mask and the exposure inappropriate area mask.

By performing the shape estimation processing of the three-dimensional model of the foreground using the foreground mask and the exposure inappropriate area mask irrespective of the location of the foreground, compared to the first embodiment in which the shape estimation processing using the limiting mask is performed, it is possible to suppress a reduction in the number of cameras participating in the shape estimation in the exposure inappropriate area.

Figure 12:
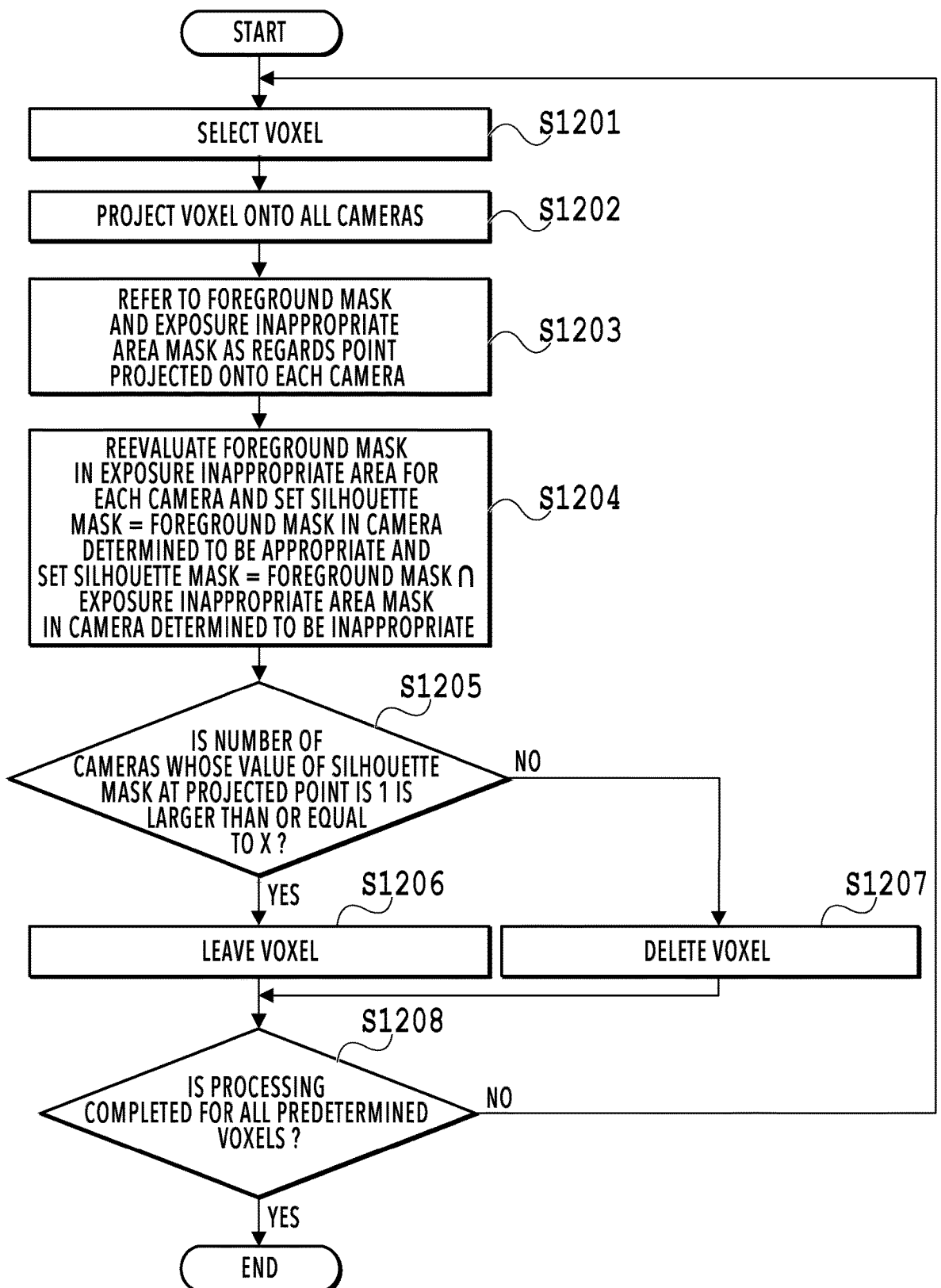
FIG. 12 is a flowchart showing a procedure example of shape estimation processing.

Next, a procedure example of the shape estimation processing by the estimation unit 726 is explained with reference to FIG. 12. FIG. 12 is a flowchart showing a procedure example of the foreground shape estimation processing by the estimation unit 726. It is assumed that the camera parameters of each camera are set before this processing is performed, as in the case with the shape estimation processing procedure example shown in FIG. 10. It is assumed that the estimation unit 726 has extracted in advance the target silhouette from the frame image acquired by performing synchronous image capturing. Further, it is assumed that the estimation unit 726 has generated in advance the voxel data obtained by finding the target visual hull in the voxel format. The voxel data is, for example, in the scene example in FIG. 4, data corresponding to the foreground object A, the foreground object B, and the foreground object C.

The processing at S1201 and S1202 in FIG. 12 is the same as that at S1001 and S1002 shown in FIG. 10 and explanation thereof is omitted.

At S1203, the estimation unit 726 refers to and acquires the foreground mask that is input from the background difference processing unit 716 for all the cameras and the value (1 or 0) of the respective projected points of the NGH mask or the NGL mask that is input from the detection unit 715.

At S1204, first, the estimation unit 726 performs evaluation to determine whether or not the foreground mask (mask image) located in the range of the exposure inappropriate area of each camera can be used as the silhouette mask of the visual hull method. For the camera corresponding to the foreground mask determined to be capable of being used, the estimation unit 726 adopts the foreground mask by the camera as the silhouette mask. For the camera corresponding to the foreground mask determined to be inappropriate, the estimation unit 726 adopts the logical sum of the foreground mask by the camera and the exposure inappropriate area mask as the silhouette mask. For example, in a case where it is possible to obtain the foreground mask corresponding to the object located within the exposure inappropriate area from the captured image of the camera, the estimation unit 726 performs evaluation to determine that the foreground mask located within the exposure inappropriate area can be used as the silhouette mask of the visual hull method. The reason is that the luminance range in which the foreground mask can be used as the silhouette mask of the visual hull method is wide compared to that of the area limiting texture and even the foreground mask within the exposure inappropriate area becomes usable as the silhouette mask of the visual hull method depending on the above-described evaluation results.

S1205, S1206, S1207, and S1208 in FIG. 12 are the same as S1004, S1005, S1006, and S1007 of the first embodiment shown in FIG. 10 and explanation thereof is omitted.

By performing the processing to leave the voxel or delete the voxel for all the voxels as above, the shape of the foreground (object) by the visual hull method is estimated and the data on the estimated shape of the foreground (object) is generated.

As explained above, according to the present embodiment, it is made possible to implement an apparatus that generates a virtual viewpoint image to which the HDR synthesis is applied while maintaining the shape quality of the portion by preventing the number of cameras participating substantially from being reduced as effectively as possible also in the shape estimation of the foreground within the exposure inappropriate area.

Third Embodiment

In the first embodiment, the aspect is explained in which the coloring processing is performed by using the limiting texture. In the present embodiment, an aspect is explained in which the coloring processing is performed selectively by using a foreground texture.

Figure 13:
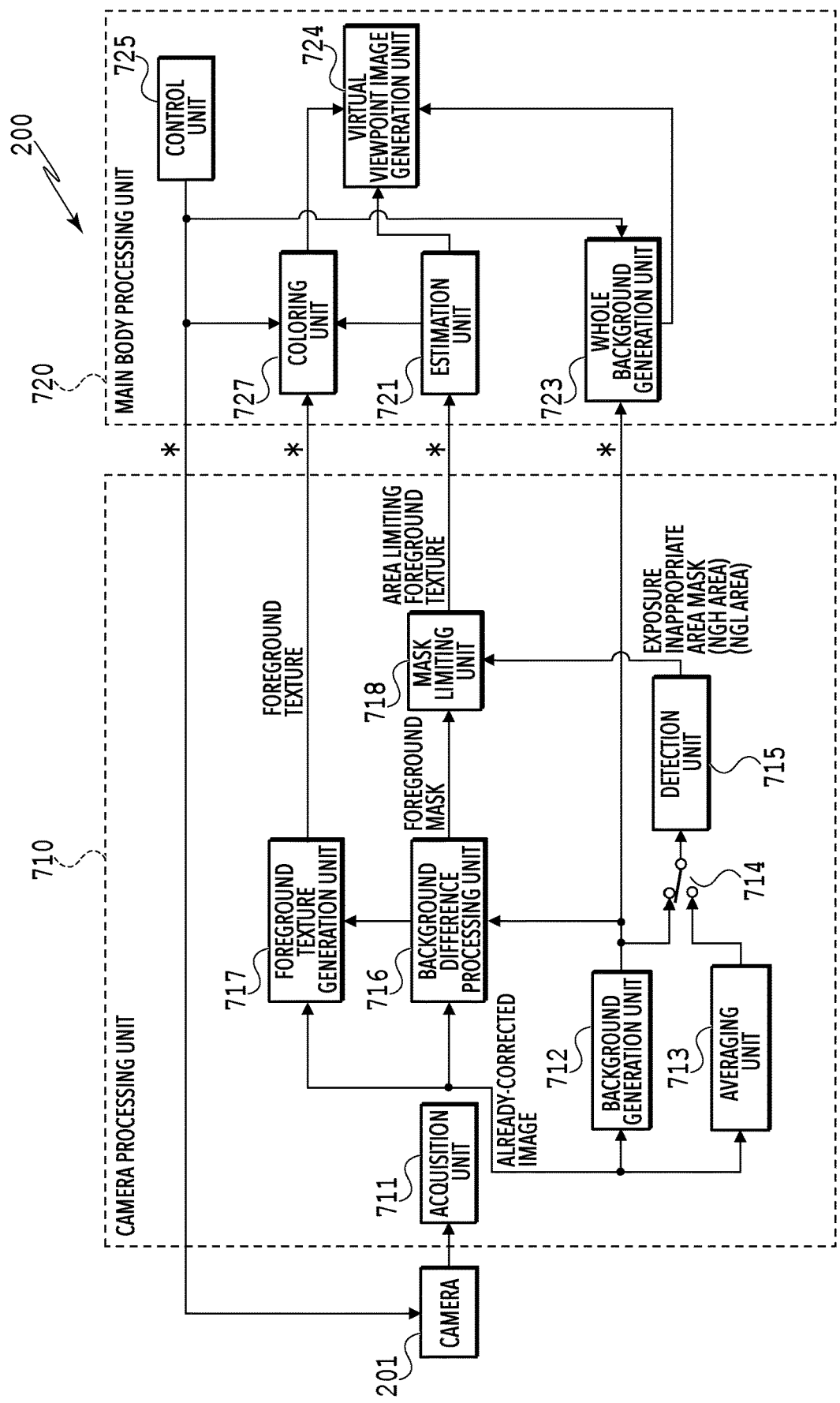
FIG. 13 is a block diagram including internal configurations of a camera processing unit and a main body processing unit.

FIG. 13 is a block diagram including the internal configurations of the camera processing unit 710 and the main body processing unit 720, both possessed by the system 200 of the present embodiment. The same symbols are attached to the same device and the same function unit as those of the system of the first embodiment and explanation thereof is omitted.

In FIG. 13 also, the camera 201 and the camera processing unit 710 indicate image capturing for each camera 201 and the flow of processing and the main body processing unit 720 in FIG. 13 indicates the flow of processing whose target is all the connected cameras.

The camera processing unit 710 extracts several pieces of image information, whose details will be described later, from the image data acquired by the camera 201 performing image capturing. The main body processing unit 720 generates virtual viewpoint image data by receiving the image information extracted by the camera processing unit 710 and performing shape estimation processing and coloring processing.

In the system 200 of the present embodiment, the configuration is such that the texture limiting unit 719 of the first embodiment is removed and the foreground texture generated by the foreground texture generation unit 717 is directly input to a coloring unit 727. That is, in the system 200 of the present embodiment, the foreground texture that is output from the foreground texture generation unit 717 is not limited to the area corresponding to the exposure inappropriate area generated by the detection unit 715 and sent to the coloring unit 727. The mechanism of the coloring unit 727 is such that coloring processing is performed by preferentially selecting results captured with an appropriate exposure value.

In the first and second embodiments, the case is mainly supposed where the brightness is different depending on the location on the field 210. In the present embodiment, it is supposed to deal with a case where the bright portion is captured from the backlight direction.

Figure 14A:
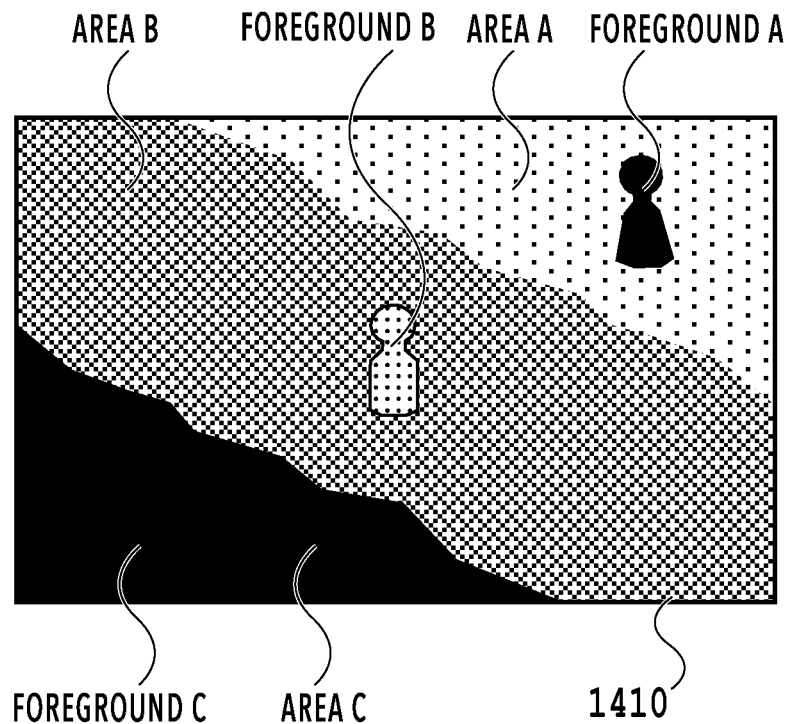
FIG. 14A and FIG. 14B are each a diagram showing an example of an image captured by a camera with a predetermined exposure value.
Figure 14B:
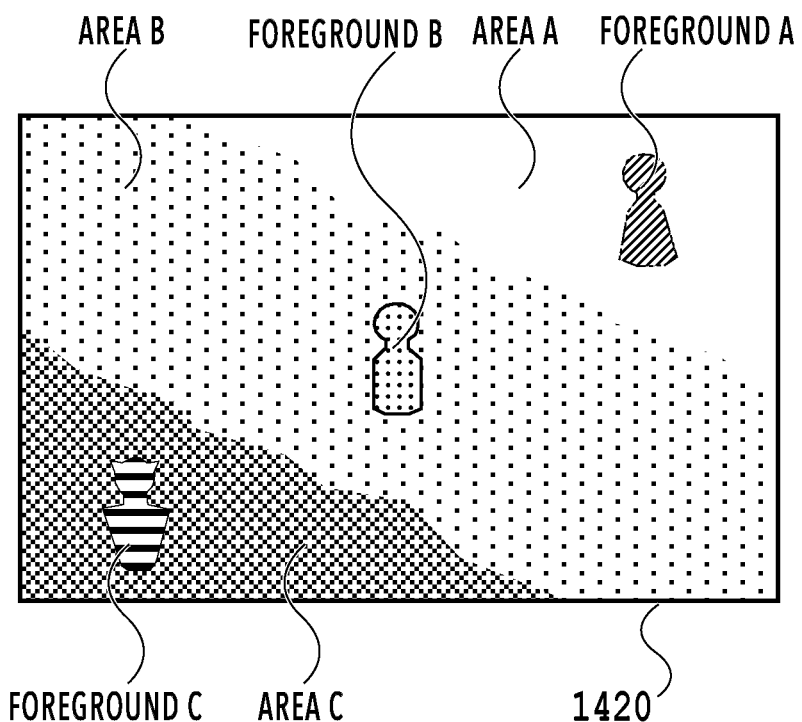

FIG. 14A and FIG. 14B are each a diagram showing an example of an image obtained by capturing a scene in which the portion of the area A on the field 210 is backlighted by a camera with a predetermined exposure value.

FIG. 14A is a diagram showing a captured image example in a case where the camera 201, for example, Cam01 shown in FIG. 4 is set as the H camera. FIG. 14B is a diagram showing a captured image example in a case where the camera 201, for example, Cam01 shown in FIG. 4 is set as the L camera.

Because the portion of the area A is backlighted, in a case where image capturing is performed by the camera 201 set as the H camera, the texture of the foreground A is in the shadow-detail loss state or in the state close thereto as in FIG. 14A. On the other hand, in a case where image capturing is performed by the camera 201 set as the L camera, the texture of the foreground A is in the state where the possibility that the exposure value is appropriate is strong as in FIG. 14B.

In the first and second embodiments, although the portion corresponding to the area A in FIG. 14B, which is in the overexposure state or in the state close thereto, is removed, in the present embodiment, the mechanism is designed so that it is made possible to select those whose evaluation is high at the time of coloring processing by taking into the case of backlight such as this and providing an evaluation reference.

Figure 15A:
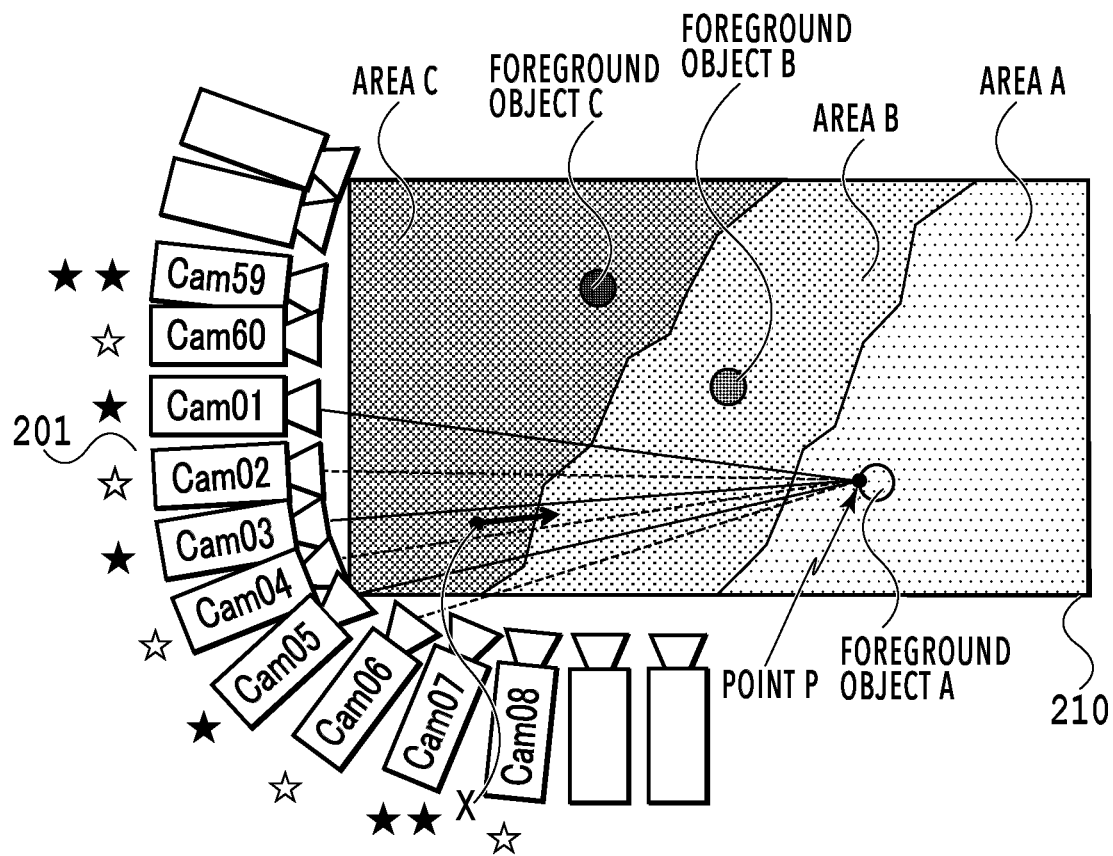
FIG. 15A and FIG. 15B are diagrams showing a relationship between cameras and foreground objects.
Figure 15B:
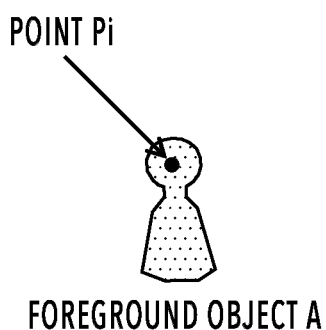

In the following, a procedure example of coloring processing by the coloring unit 727 is explained with reference to FIG. 15A to FIG. 17. FIG. 15A and FIG. 15B are diagrams showing a relationship example between the cameras and the foreground objects.

For explanation, the state as shown in FIG. 15A and FIG. 15B is assumed. As regards coloring processing, coloring of a point P located on the surface of the foreground object A is explained. The point P is a position defined by three-dimensional coordinates in a three-dimensional space.

The arrangement of the areas A, B, and C, the foreground objects A, B, and C, and the cameras, and the meaning of the solid black star mark, the solid white star mark, and the like in FIG. 15A are the same as those in FIG. 14 and explanation thereof is omitted. FIG. 15B is a captured image of the ith camera.

The point on the captured image of the ith camera onto which the point P in the three-dimensional space is projected is taken to be Pi. Pi is a point defined by two-dimensional coordinates within the captured image of each camera. The position of Pi is derived from the position of the original point P in the three-dimensional space based on information obtained by calibration.

The coloring processing of the point P in the three-dimensional space is performed based on the pixel value in Pi of the captured image of all or a part of the cameras.

Actually, the point P on the foreground object is not necessarily seen from all the cameras. Because of this, as the coloring method, for example, there is (1) a method of performing coloring processing by preferentially selecting the pixel value at the coordinates Pi of the captured image of the camera close to the direction in which a virtual viewpoint X shown in FIG. 15A exists. Alternatively, there is (2) a method of performing coloring processing by preferentially selecting the coordinates Pi of the captured image of the camera close to the normal direction of the portion of the point P in the three-dimensional space of the foreground object A, or the like. In each of the cases of the coloring methods (1) and (2), the number of cameras to be selected for coloring processing is not limited to one and it may also be possible to perform coloring processing of the point P in the three-dimensional space by selecting a plurality of cameras in the vicinity thereof and performing weighted averaging of the pixel values at the coordinates Pi of each captured image.

In the present embodiment, the six cameras are taken to be adoption candidates, which are near the direction of the virtual viewpoint X in the coloring method (1) as a center and the pixel value of the point P in the three-dimensional space is found by performing the above-described coloring processing based on the coordinates Pi of these captured images. The number of adoption candidate cameras does not necessarily need to be six and is only required to be two or more.

In the present embodiment, each weighting coefficient of the above-described six cameras is represented by a vector [A] as expressed by formula 1 below. The weighting coefficients of Cam01, Cam02, Cam03, Cam04, Cam05, and Cam06 are taken to be a1, a2, a3, a4, a5, and a6, respectively.

[Mathematical formula 1]

$$[A]=[a1,a2,a3,a4,a5,a6] \quad (1)$$

Further, the pixel values obtained by arranging in order the pixel value at the coordinates Pi of the captured image of the ith camera (Cami) of the six cameras from the first pixel value to the sixth pixel value are represented by a vector [C] as expressed by formula 2 below.

[Mathematical formula 2]

$$[C]=[c1,c2,c3,c4,c5,c6] \quad (2)$$

Values Hi obtained by arranging in order the value Hi that is a pixel value Ci corrected to a standard exposure value are represented by a vector [H] as expressed by formula 3 below.

[Mathematical formula 3]

$$[H]=[H1,H2,H3,H4,H5,H6] \quad (3)$$

Each component Hi of [H] is found by performing exposure correction for the pixel value Ci by a function H ( ) as expressed by formula 4 below.

[Mathematical formula 4]

$$Hi=H(Ci) \quad (4)$$

Although there is a case where the exposure correction is performed by simply adding or subtracting a predetermined value, as accurate exposure correction, it is also possible to use a method in which the gamma value of the captured image is temporarily converted linearly and after multiplying a predetermined coefficient, the value is returned to the original gamma value, and the like.

Whether or not to select the camera from among the camera adoption candidates for the actual coloring is represented by a vector [J] as expressed by formula 5 below. Each component Ji is a value of 1 or 0 and represents whether or not to adopt the camera for coloring processing and "1" indicates adopting the target camera for coloring processing and "0" indicates not adopting the target camera for coloring processing.

[Mathematical formula 5]

$$[J]=[J1,J2,J3,J4,J5,J6] \quad (5)$$

Figure 16A:
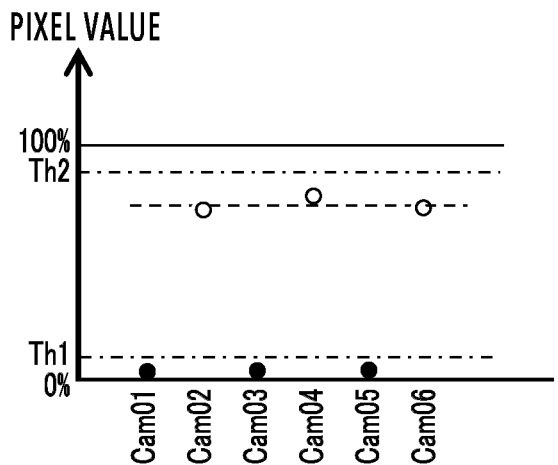
FIG. 16A to FIG. 16D are each a diagram explaining camera selection and exposure correction.
Figure 16B:
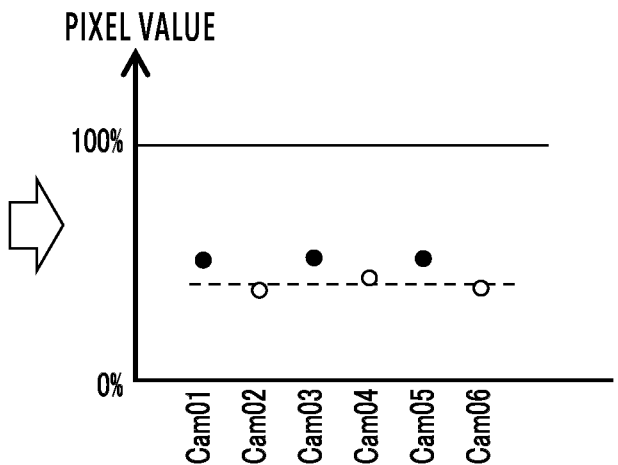
Figure 16C:
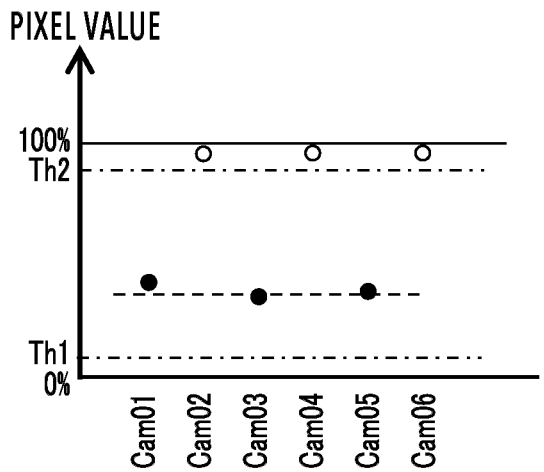
Figure 16D:
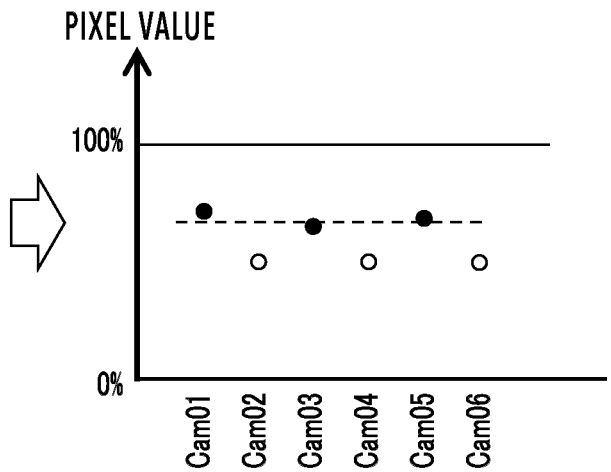

Here, camera selection and exposure correction are explained with reference to FIG. 16A to FIG. 16D. FIG. 16A to FIG. 16D are diagrams explaining the camera selection and the exposure correction. FIG. 16A is a diagram showing the pixel values before the exposure correction, including the pixel values less than a lower limit threshold value (Th1), in the captured images of the selected cameras. FIG. 16B is a diagram showing the pixel values after performing the exposure correction for the pixel values shown in FIG. 16A. FIG. 16C is a diagram showing the pixel values before the exposure correction, including the pixel values greater than an upper limit threshold value (Th2), in the captured images of the selected cameras. FIG. 16D is a diagram showing the pixel values after performing the exposure correction for the pixel values shown in FIG. 16A.

FIG. 16A and FIG. 16B (also referred to as upper section of FIG. 16A to FIG. 16D) are diagrams in which the pixel value Ci of the captured images are arranged in order. FIG. 16C and FIG. 16D (also referred to as lower section of FIG. 16A to FIG. 16D) are diagrams in which the value Hi obtained by performing the exposure correction for the pixel value Ci to a standard exposure value is similarly arranged in order. Consequently, the horizontal axis in FIG. 16A to FIG. 16D does not have a physical meaning in particular. In FIG. 16A to FIG. 16D, a ○ mark indicates data on the camera belonging to the H cameras and a ● mark indicates data on the camera belonging to the L cameras.

FIG. 16A and FIG. 16B are diagrams showing the pixel value of each camera in a case where the bright portion (area A) shown in FIG. 15A and FIG. 15B is backlighted. FIG. 16C and FIG. 16D are diagrams showing the pixel value of each camera in a case where the bright portion (area A) shown in FIG. 15A and FIG. 15B is not backlighted.

In the case of the upper section, as shown in FIG. 16A, the pixel value Ci (● mark) of the captured image by the L camera is in the state close to the shadow-detail loss state, and therefore, it has not been possible to capture the luminance accurately at the time of image capturing. The pixel value Ci (○ mark) of the captured image by the H camera indicates image capturing with an appropriate exposure value, and therefore, it has been possible to capture the luminance accurately at the time of image capturing.

The pixel value Ci of the captured image by the L camera is in the shadow-detail loss state, and therefore, as shown in FIG. 16B, the pixel value Hi after the exposure correction is a value brighter than the original value (pixel value of the captured image). The pixel value Ci of the captured image by the H camera has captured the luminance accurately, and therefore, the pixel value Hi after the exposure correction is an appropriate value.

In the case of the lower section, as shown in FIG. 16C, the pixel value Ci (○ mark) of the captured image by the H camera is in the state close to the overexposure state, and therefore, it has not been possible to capture the luminance accurately at the time of image capturing. The pixel value Ci (● mark) of the captured image by the L camera indicates image capturing with an appropriate exposure value, and therefore, it has been possible to capture the luminance accurately at the time of image capturing.

The pixel value Ci of the captured image by the H camera is in the overexposure state, and therefore, as shown in FIG. 16D, the pixel value Hi after the exposure correction is a value darker than the original value (pixel value of the captured image). The pixel value Ci of the captured image by the L camera has captured the luminance accurately, and therefore, the pixel value Hi after the exposure correction is an appropriate value.

The broken line in FIG. 16A and FIG. 16C indicates the level at which the luminance can be acquired accurately. The broken line in FIG. 16B and FIG. 16D indicates the level after performing the exposure correction for the level shown in FIG. 16A and FIG. 16C.

In the case of the upper section, by removing the data (● mark) from the camera that acquires the captured image including shadow-detail loss, it is possible to obtain the accurate exposure correction results (appropriate data after exposure correction). In the case of the lower section, by removing the data (○ mark) from the camera that acquires the captured image including overexposure, it is possible to obtain the accurate exposure correction results (appropriate data after exposure correction).

In the present embodiment, as the method of removing the inaccurate data described above, the method of determining whether or not the pixel value Ci after image capturing is included between the lower limit threshold value Th1 and the upper limit threshold value Th2 is used. In a case where the pixel value Ci is not included between the lower limit threshold value Th1 and the upper limit threshold value Th2, the data is the deletion-target data.

The numerical value of the lower limit threshold value Th1 aims at removal of the data in the shadow-detail state or in the state close thereto and it is desirable for the numerical value to be, for example, a numerical value of about 10% of the pixel value. The numerical value of the upper limit threshold value Th2 aims at removal of the data in the overexposure state or in the state close thereto and it is desirable for the numerical value to be, for example, a numerical value of about 90% of the pixel value. Note that, depending on the state of gamma applied to the pixel value data or tuning of the apparatus, the numerical value may be a value largely different from those described above.

The vector [J] is a vector representing the results of removing the inappropriate cameras and adopting the appropriate cameras. For example, in the case of the upper section in FIG. 16A to FIG. 16D, the vector [J] is expressed by a formula below.

$$[J]=[0,1,0,1,0,1]$$

Further, in the case of the lower section in FIG. 16A to FIG. 16D, the vector [J] is expressed by a formula below.

$$[J]=[1,0,1,0,1,0]$$

Figure 17:
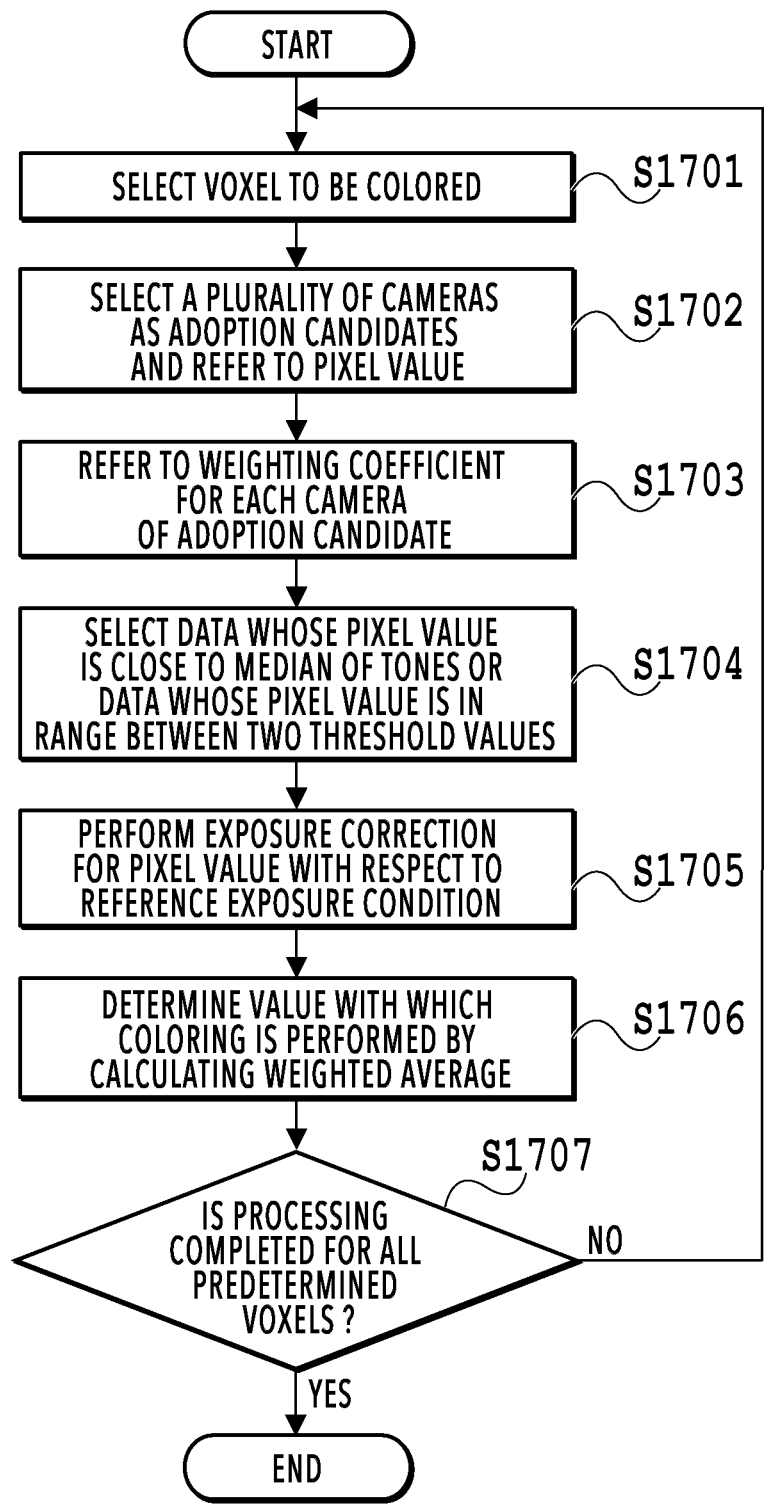
FIG. 17 is a flowchart showing a procedure example of coloring processing.

Next, a procedure example of the coloring processing by the coloring unit 727 of the system 200 of the present embodiment is explained with reference to FIG. 17. FIG. 17 is a flowchart showing a procedure example of the coloring processing by the coloring unit 727.

At S1701, the coloring unit 727 selects the voxel of interest, which is the target for which the coloring processing is performed. For example, the coloring unit 727 selects the point P located on the surface of the foreground object A shown in FIG. 15A and FIG. 15B.

At S1702, the coloring unit 727 selects, for example, the cameras Cam01 to Cam06 in the vicinity of the direction of the point X shown in FIG. 15A as adoption candidates and refers to and acquires the pixel value vector [C] at Pi. The pixel value vector [C] at Pi is derived by a publicly known method and stored in a storage device 1804, whose details will be described later, or the like.

At S1703, the coloring unit 727 refers to and acquires the weighting coefficient vector [A] determined in advance and stored in the storage device 1804 or the like.

At S1704, the coloring unit 727 determines the contents of the vector [J] adopting the data whose pixel value is close to the median of tones or the data whose pixel value is between the lower limit threshold value Th1 and the upper limit threshold value Th2, which are the two predetermined threshold values determined in advance. That is, in a case where the pixel value of the pixel of the captured image by the target camera is close to the median of the tones, or the pixel value is between the lower limit threshold value Th1 and the upper limit threshold value Th2, the coloring unit 727 determines the vector [J] corresponding to the target camera to be "1" indicating that the target camera is adopted for the coloring processing. In a case where the pixel value of the pixel of the captured image by the target camera is not close to the median of tones, or the pixel value is not between the lower limit threshold value Th1 and the upper limit threshold value Th2, the coloring unit 727 determines the vector [J] corresponding to the target camera to be "0" indicating that the target camera is not adopted for the coloring processing. Whether or not the pixel value is close to the median of tones may be determined by determining whether or not the pixel value is within a predetermined range including the median of tones, which is determined in advance.

At S1705, the coloring unit 727 derives the pixel value Hi of the pixel after the correction from the pixel value Ci of the pixel in the captured image based on, for example, the function H ( ) as expressed by formula 4 described above. That is, the coloring unit 727 derives the pixel value Hi of the pixel after the correction by performing the exposure correction for the pixel value Ci of the pixel in the captured image with respect to the reference exposure condition.

At S1706, the coloring unit 727 determines a value Color_P with which coloring is performed by using, for example, formula 6 and formula 7 below. That is, the coloring unit 727 determines the pixel value to be assigned to the pixel of the corresponding shape data in the coloring processing by calculating the weighted average of the pixel value Hi of the pixel after the correction, which is obtained at S1705. Here, [H]$^t$ indicates transposition of the vector H.

[Mathematical formula 6]

$$[AJ] = [a1*J1, a2*J2, a3*J3, a4*J4, a5*J5, a6*J6] \quad (6)$$

[Mathematical formula 7]

$$\text{Color\_P} = \frac{[AJ] \times [H]^t}{\sum_{i=1}^{6} Aj(i)} \quad (7)$$

At S1707, the coloring unit 727 determines whether or not the processing is completed for all the predetermined voxels. In a case of determining that there is an unprocessed voxel and all the predetermined voxels are not processed (NO at S1707), the coloring unit 727 moves the processing to S1701 and continues the processing at S1701 to S1707. In a case of determining that there is no unprocessed voxel and all the predetermined voxels are processed (YES at S1707), the coloring unit 727 terminates this flow.

By performing the processing by the above-described process, even in a case of an object whose dynamic range of brightness is wide or in an image capturing environment in which the dynamic range of brightness is wide, it is made possible to perform appropriate coloring processing for the estimated foreground three-dimensional model without the estimation of the foreground there-dimensional model being failed.

Figure 18:
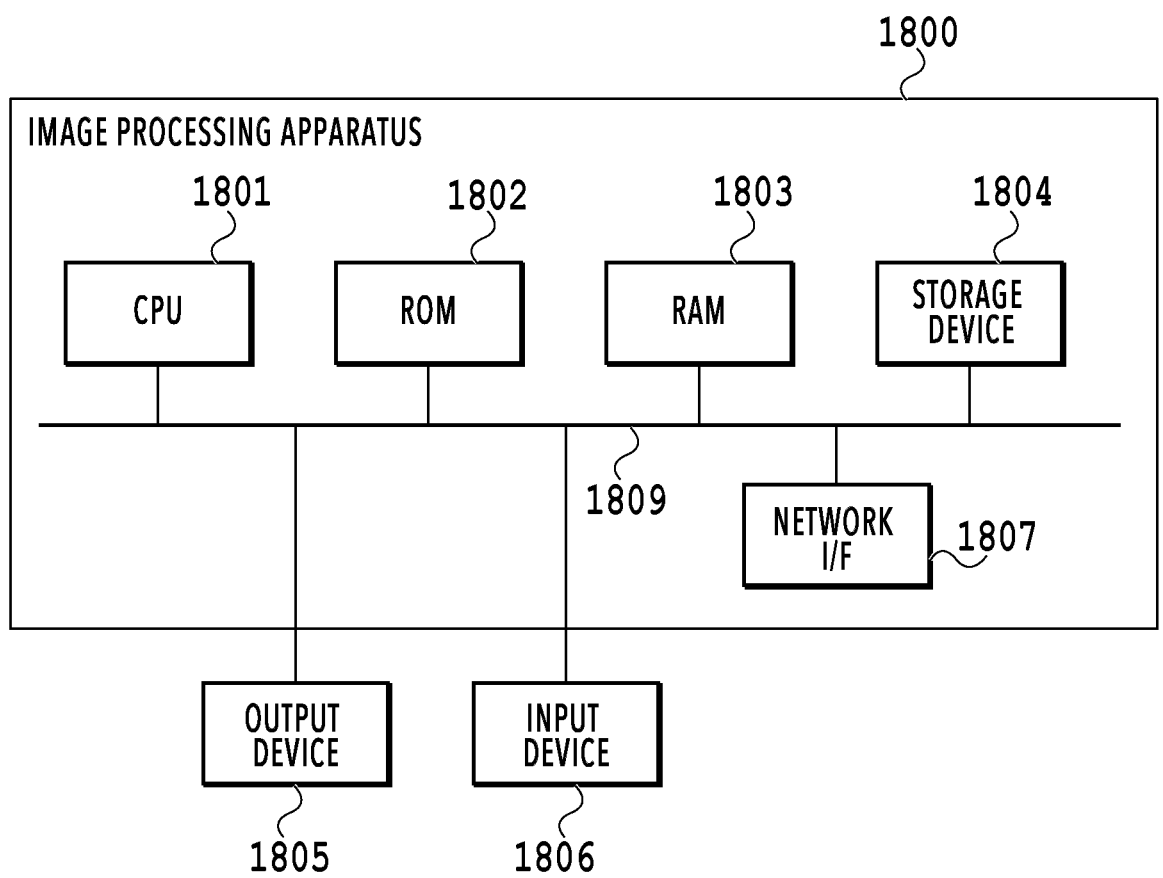
FIG. 18 is a diagram showing a hardware configuration example of an image processing apparatus.

FIG. 18 is a diagram showing a hardware configuration example of the image processing apparatus 202 in the system 200 of the first, second, and third embodiments described above. An image processing apparatus 1800 has a CPU 1801, a ROM 1802, a RAM 1803, the storage device 1804, and a network I/F (interface) 1807. Each component is connected via a bus 1809 so as to be capable of communicating with one another. Further, to the image processing apparatus 1800, an output device 1805 and an input device 1806 are connected.

The CPU 1801 centralizedly controls the image processing apparatus 1800 by executing programs stored in the ROM 1802 or the storage device 1804. The ROM 1802 stores control programs of the image processing apparatus 1800. The RAM 1803 functions as a main memory at the time of the CPU 1801 executing programs and is used as a temporary storage area. The storage device 1804 is a storage medium, such as an HDD (Hard Disk Drive) and an SSD (Solid State Drive), and stores image data, various programs, and the like.

The output device 1805 is a display device, such as a liquid crystal display, and displays various kinds of setting information, image data, and the like. The input device 1806 is a mouse, a keyboard, a touch panel or the like, and receives an input of various kinds of setting information and operation instructions from a user. The network I/F 1807 is an interface for performing communication with an external apparatus via a network.

It may also be possible for the image processing apparatus 1800 to have one piece or a plurality of pieces of dedicated hardware different from the CPU 1801 or a GPU (Graphics Processing Unit). In such a case, it may also be possible for the GPU or the dedicated hardware to perform at least part of the processing by the CPU 1801. As an example of dedicated hardware, there is an ASIC (Application Specific Integrated Circuit), a DSP (Digital Signal Processor) or the like.

Further, it may also be possible to configure the camera processing unit 710 in the system 200 of the first, second, and third embodiments described above as hardware and as in the case with the main body processing unit 720, it may also be possible to configure the camera processing unit 710 by the image processing apparatus 1800 described above.

While the hardware configuration example of the image processing apparatus 1800 in the first, second, and third embodiments has been explained as above, the hardware configuration is not limited to the above-described configuration. An aspect may also be accepted in which the CPU functions as each unit shown in FIG. 7, FIG. 11, and FIG. 13 by reading programs stored in the ROM or the like onto the RAM and executing the programs. That is, it may also be possible for the image processing apparatus 1800 to implement each module shown in FIG. 7, FIG. 11, and FIG. 13 as a module of software.

Other Embodiments

While the first, second, and third embodiments have been described in detail, the present disclosure is also adaptable to embodiments in various forms including a system, an apparatus, a method, a program, and a storage medium (a memory medium), for example. To be more precise, the present disclosure is adaptable to a system including multiple instruments (including a host computer, an interface device, an image capturing apparatus, and web applications, for example). Alternatively, the present disclosure is adaptable to an apparatus consisting of a single instrument.

Further, in the embodiments described previously, the aspect is explained in which the one image processing apparatus 202 acquires the image data from a plurality of cameras and generates the background image and determines the foreground area in each camera. Note that, the aspect is not limited to this. For example, an aspect may be accepted in which the hardware of each camera, or the image processing apparatus attached to each camera has the functions except for the function of the virtual viewpoint image generation unit. Then, an aspect may also be accepted in which images representing the background image and the foreground area are generated on the side of each camera and each piece of generated data is transmitted to the apparatus that generates a virtual viewpoint image.

In the embodiments described previously, the system 200 is explained that has the camera 201, the camera processing unit 710 of the camera adaptor, and the main body processing unit 720 of the image processing apparatus 202. The system 200 may be configured so as to have the image processing apparatus 202 comprising the camera 201, the camera processing unit 710, and the main body processing unit 720.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

According to the present embodiments, even in a case of an object whose dynamic range of brightness is wide or in an image capturing environment in which the dynamic range of brightness is wide, it is possible to appropriately generate data relating to the object.

This application claims the benefit of Japanese Patent Application No. 2019-104733, filed Jun. 4, 2019, which is hereby incorporated by reference wherein in its entirety.

What is claimed is:

1. An image processing system comprising:
at least one processor connected to at least one memory, the at least one processor and at least one memory being configured to cause the image processing system to operate as:
a first acquisition unit configured to acquire a plurality of foreground masks for extracting an object, corresponding to each of a plurality of captured images acquired by capturing the object with a plurality of image capturing units;
a second acquisition unit configured to acquire a plurality of inappropriate area masks for masking an exposure inappropriate area corresponding to the plurality of captured images by detecting an area whose exposure value is inappropriate in each of the plurality of captured images; and
a generation unit configured to generate shape data representing a three-dimensional shape of the object based on the plurality of foreground masks and the plurality of inappropriate area masks, wherein
the second acquisition unit detects:
a portion whose pixel value is greater than an upper limit threshold value of a first luminance range in the captured image as a first inappropriate area, which is acquired by performing image capturing with the image capturing unit of which the first luminance range is set relatively lower among the plurality of image capturing units;
a portion whose pixel value is less than a lower limit threshold value of a second luminance range in the captured image as a second inappropriate area, which is acquired by performing image capturing with the image capturing unit of which the second luminance range is set relatively higher among the plurality of image capturing units, and
wherein the generation unit generates, in a case where the foreground mask corresponding to the area whose exposure value is inappropriate can be used as a silhouette mask for shape data generation, the shape data by using the foreground mask.

2. The image processing system according to claim 1, wherein
the generation unit generates the shape data based on a limiting mask obtained as a logical sum of the foreground mask and the inappropriate area mask.

3. The image processing system according to claim 2, wherein
the generation unit generates, in a case where the foreground mask corresponding to the area whose exposure value is inappropriate cannot be used as a silhouette mask for shape data generation, the shape data by using the limiting mask.

4. The image processing system according to claim 1, wherein
the second acquisition unit acquires the inappropriate area mask based on a background image generated from the captured image or an average image obtained by averaging each pixel of a background image during a predetermined period, which is generated from the captured image.

5. The image processing system according to claim 1, wherein
the generation unit generates the shape data by a visual hull method that takes a logical sum of a first exposure mask indicating the first inappropriate area or a second exposure mask indicating the second inappropriate area, and the foreground mask as a silhouette mask.

6. The image processing system according to claim 1, comprising the at least one processor and at least one memory being configured to cause the image processing system to operate as:
a coloring unit configured to generate color data to be assigned to the shape data based on a foreground texture extracted from the captured image or a limiting texture obtained as a logical sum of the foreground texture and the inappropriate area mask.

7. The image processing system according to claim 6, wherein
the coloring unit generates the color data based on at least a pixel value of a pixel projected onto the captured image from a point on a surface of a foreground object represented by the shape data.

8. The image processing system according to claim 7, wherein
the coloring unit generates the color data by preferentially using the foreground texture extracted from the captured image captured with the appropriate exposure value.

9. The image processing system according to claim 8, wherein
the coloring unit corrects a pixel value of the pixel in the captured image corresponding to the image capturing unit in accordance with the exposure value set to the image capturing unit and generates the color data to which a pixel value is assigned, which is obtained based on the corrected pixel value of the pixel and a predetermined coefficient set in advance to the image capturing unit.

10. The image processing system according to claim 6, comprising the at least one processor and at least one memory being configured to cause the image processing system to operate as:
an information processing apparatus provided in the image capturing unit and which performs predetermined processing for the captured image acquired by the image capturing unit; and
an image processing apparatus connected to the information processing apparatus and which generates data relating to the object based on the captured image for which the predetermined processing has been performed in the information processing apparatus, wherein
the information processing apparatus has the first acquisition unit and the second acquisition unit and
the image processing apparatus has the generation unit and the coloring unit.

11. The image processing system according to claim 1, comprising the at least one processor and at least one memory being configured to cause the image processing system to operate as:
an information processing apparatus provided in the image capturing unit and which performs predetermined processing for the captured image acquired by the image capturing unit; and
an image processing apparatus connected to the information processing apparatus and which generates data relating to the object based on the captured image for which the predetermined processing has been performed in the information processing apparatus, wherein
the information processing apparatus has the first acquisition unit and the second acquisition unit and
the image processing apparatus has the generation unit.

12. The image processing system according to claim 1, wherein
images from a plurality of viewpoints captured by a plurality of the image capturing units are acquired as the captured images and
the image processing system generates a virtual viewpoint image by using the images from the plurality of viewpoints and the shape data generated by the generation unit.

13. The image processing system according to claim 1, wherein
an information processing apparatus is configured to generate a limiting mask that limits the foreground mask to a specific area based on the acquired foreground mask and the acquired inappropriate area mask is configured to output the limiting mask.

14. The image processing system according to claim 1, wherein
the first acquisition unit generates the foreground mask and
the second acquisition unit generates the inappropriate area mask.

15. An image processing method comprising:
acquiring a plurality of foreground masks for extracting an object, corresponding to each of a plurality of captured images acquired by capturing the object with a plurality of image capturing units;
acquiring a plurality of inappropriate area masks for masking an exposure inappropriate area corresponding to the plurality of captured images by detecting an area whose exposure value is inappropriate in each of the plurality of captured images; and
generating shape data representing a three-dimensional shape of the object based on the plurality of foreground masks and the plurality of inappropriate area masks, wherein
the detecting an area whose exposure value is inappropriate in the captured image includes detecting:
a portion whose pixel value is greater than an upper limit threshold value of a first luminance range in the captured image as a first inappropriate area, which is acquired by performing image capturing with the image capturing unit of which the first luminance range is set relatively lower among the plurality of image capturing units; and
a portion whose pixel value is less than a lower limit threshold value of a second luminance range in the captured image as a second inappropriate area, which is acquired by performing image capturing with the image capturing unit of which the second luminance range value is set relatively higher among the plurality of image capturing units,
wherein in the generating, in a case where the foreground mask corresponding to the area whose exposure value is inappropriate can be used as a silhouette mask for shape data generation, the shape data by using the foreground mask.

16. A non-transitory computer readable storage medium storing a program for causing a computer to execute an image processing method, the image processing method comprises:

acquiring a plurality of foreground masks for extracting an object, corresponding to each of a plurality of captured images acquired by capturing the object with a plurality of image capturing units;

acquiring a plurality of inappropriate area masks for masking an exposure inappropriate area corresponding to the plurality of captured images by detecting an area whose exposure value is inappropriate in each of the plurality of captured images; and generating shape data representing a three-dimensional shape of the object based on the plurality of foreground masks and the plurality of inappropriate area masks, wherein the detecting an area whose exposure value is inappropriate in the captured image includes detecting:

a portion whose pixel value is greater than an upper limit threshold value of a first luminance range in the captured image as a first inappropriate area, which is acquired by performing image capturing with the image capturing unit of which the first luminance range is set relatively lower among the plurality of image capturing units; and a portion whose pixel value is less than a lower limit threshold value of a second luminance range in the captured image as a second inappropriate area, which is acquired by performing image capturing with the image capturing unit of which the second luminance range value is set relatively higher among the plurality of image capturing units, wherein in the generating, in a case where the foreground mask corresponding to the area whose exposure value is inappropriate can be used as a silhouette mask for shape data generation, the shape data by using the foreground mask.

* * * * *